US012594764B2

(12) United States Patent
Sugawara

(10) Patent No.: US 12,594,764 B2
(45) Date of Patent: Apr. 7, 2026

(54) LIQUID EJECTION HEAD AND MANUFACTURING METHOD OF LIQUID EJECTION HEAD

(71) Applicant: CANON KABUSHIKI KAISHA, Tokyo (JP)

(72) Inventor: Takashi Sugawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 18/507,564

(22) Filed: Nov. 13, 2023

(65) Prior Publication Data

US 2024/0157701 A1 May 16, 2024

(30) Foreign Application Priority Data

Nov. 14, 2022 (JP) ................................ 2022-181952

(51) Int. Cl.
*B41J 2/16* (2006.01)
*B41J 2/14* (2006.01)

(52) U.S. Cl.
CPC ......... *B41J 2/1623* (2013.01); *B41J 2/14233* (2013.01); *B41J 2/161* (2013.01)

(58) Field of Classification Search
CPC ...... B41J 2/1623; B41J 2/14233; B41J 2/161; B41J 2002/14241; B41J 2/055; B41J 2/14; B41J 2002/14419; B41J 2/1433; B41J 2/14201; B41J 2/162; B41J 2002/14306
See application file for complete search history.

(56) References Cited

U.S. PATENT DOCUMENTS 7,594,714 B2 9/2009 Katayama
8,449,094 B2 * 5/2013 Okubo .................. B41J 2/1623
347/68

FOREIGN PATENT DOCUMENTS

JP 2006-095725 A 4/2006

* cited by examiner

*Primary Examiner* — Lisa Solomon
(74) *Attorney, Agent, or Firm* — Venable LLP

(57) ABSTRACT

A liquid ejection head has a first substrate, a second substrate, and a damper member suppressing vibrations of a liquid. The damper member bonds the first substrate and the second substrate to each other by an adhesive agent. The damper member has a first area sandwiched between the first substrate and the second substrate and a second area not sandwiched between the first substrate and the second substrate. In the second area, the adhesive agent adheres to the side surface of the damper member so as to fix the damper member firmly.

18 Claims, 20 Drawing Sheets

LIQUID EJECTION HEAD AND MANUFACTURING METHOD OF LIQUID EJECTION HEAD

BACKGROUND

Field of the Invention

The present invention relates to a liquid ejection head and a manufacturing method of a liquid ejection head.

Description of the Related Art

As one example of a liquid ejection head for ejecting liquid droplets, an ink jet head mounted on an ink jet printing apparatus is known. The ink jet head is configured to eject ink droplets from an ejection port by applying pressure to ink within a pressure chamber by a drive unit.

Accompanying the ejection of ink droplets, pressure variations occur, and therefore, there is a case where the pressure variations propagate to another pressure chamber via a liquid flow path. In such a case, there is a possibility that an ejection failure occurs due to so-called crosstalk. As one example of a method of lessening the influence of crosstalk, there is a method of damping pressure variations by using a damper.

Japanese Patent Laid-Open No. 2006-095725 has disclosed a liquid ejection substrate comprising a sheet-shaped elastic member having an area functioning as a damper.

However, with the configuration of Japanese Patent Laid-Open No. 2006-095725, an ejection port is also formed in the sheet-shaped elastic member, and therefore, the area functioning as a damper is comparatively narrow. Here, it is conceivable that the area functioning as a damper is formed comparatively large by not forming the ejection port in the elastic member. However, in this case, it is required to firmly fix the elastic member having the damper function.

SUMMARY

Consequently, an object of the present invention is to provide a technique to firmly fix an elastic member. The liquid ejection head of the present invention includes: a first substrate; a second substrate; and a damper member suppressing vibrations of a liquid, wherein the damper member is bonded to the first substrate and the second substrate by an adhesive agent, the damper member has a first area sandwiched between the first substrate and the second substrate and a second area not sandwiched between the first substrate and the second substrate, and in the second area, the adhesive agent sticks to a side surface of the damper member.

Further features of the present invention will become apparent from the following description of exemplary embodiments with reference to the attached drawings.

DESCRIPTION OF THE EMBODIMENTS

First Embodiment

<Liquid Ejection Apparatus>

A liquid ejection apparatus in the present embodiment comprises a liquid ejection head performing printing for a printing medium while ejecting a liquid. The liquid ejection head comprises a casing having a liquid storage unit capable of storing a liquid, a liquid ejection substrate provided at the bottom surface portion of the casing, and an electrical connection portion sending power and a control signal to the liquid ejection substrate. In the following, a first liquid ejection substrate 100 that can be employed as a liquid ejection substrate of the present embodiment is explained.

<Explanation of the First Liquid Ejection Substrate 100>

Figure 1:
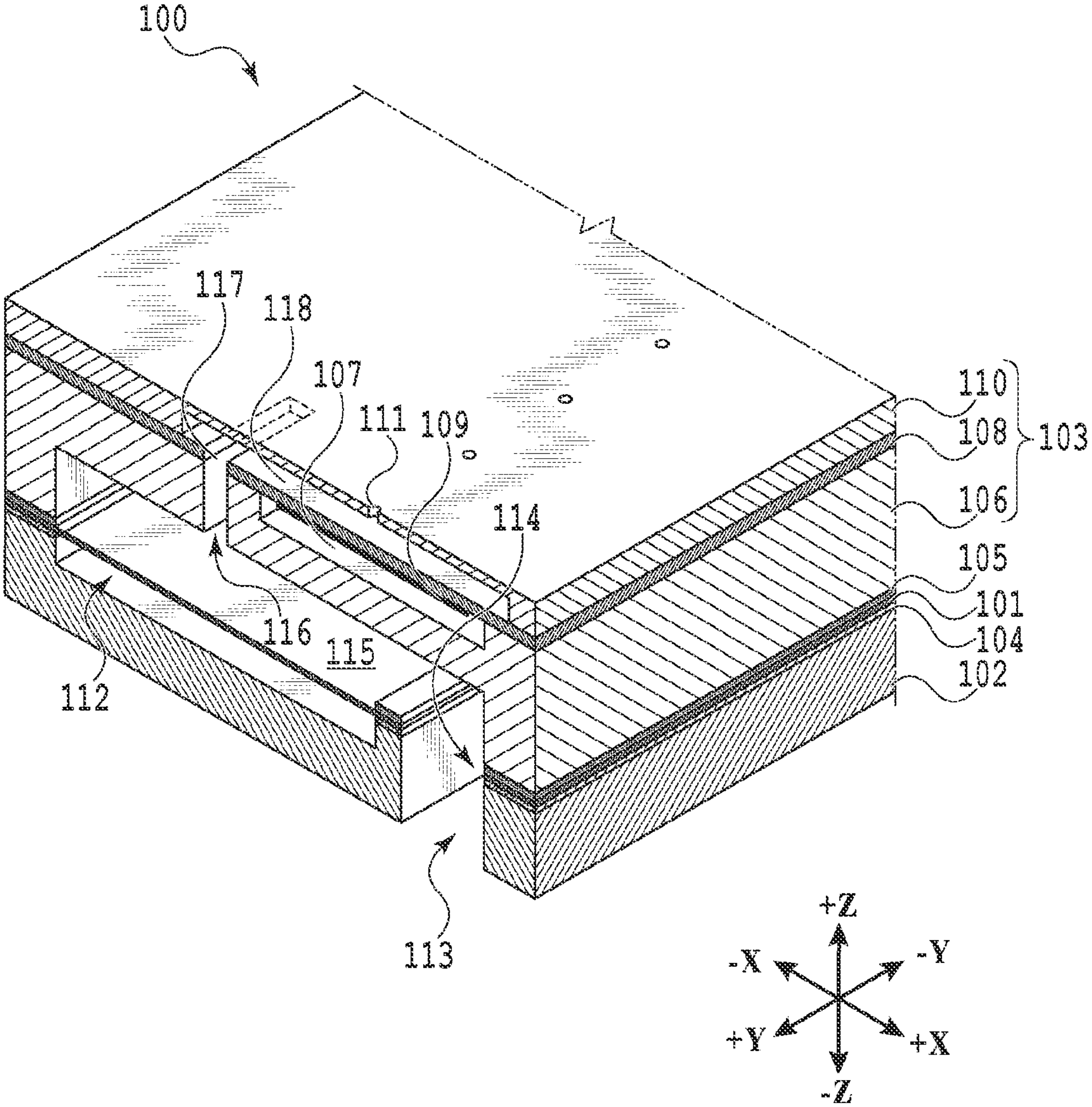
FIG. 1 is a schematic cross-sectional perspective diagram of a liquid ejection substrate in one embodiment.

FIG. 1 is a schematic cross-sectional perspective diagram of the first liquid ejection substrate 100 in the present embodiment. In each drawing in the present specification, an X-direction indicates the width direction of the first liquid ejection substrate 100. A Y-direction indicates the depth direction of the first liquid ejection substrate 100. A Z-direction indicates the height direction of the first liquid ejection substrate 100. The surface facing toward the +Z-direction in the first liquid ejection substrate 100 is appropriately called “top surface”. The surface facing toward the −Z-direction in the first liquid ejection substrate 100 is appropriately called “bottom surface”. The X-direction, the Y-direction, and the Z-direction are perpendicular to one another.

As shown in FIG. 1, the first liquid ejection substrate 100 in the present embodiment includes a first support substrate 102 supporting an elastic member 101 from the bottom surface and a second support substrate 103 supporting the elastic member 101 from the top surface. Between the top surface of the first support substrate 102 and the bottom surface of the elastic member 101, the layer of a first bonding member 104 is formed. Between the top surface of the elastic member 101 and the bottom surface of the second support substrate 103, the layer of a second bonding member 105 is formed. As described above, the elastic member 101 is sandwiched and fixed between the first support substrate 102 and the second support substrate 103 via the first bonding member 104 and the second bonding member 105.

The second support substrate 103 includes a first substrate member 106 to the bottom surface of which the second bonding member 105 sticks. In the first substrate member 106, an accommodation space 107 concave from the top surface toward the bottom surface is formed. To the top surface of the first substrate member 106, a vibration plate 108 is bonded so as to cover the accommodation space 107. At the bottom surface of the vibration plate 108, a piezoelectric element 109 is arranged. The piezoelectric element 109 is accommodated in the accommodation space 107.

The second support substrate 103 further includes a second substrate member 110 bonded to the top surface of the vibration plate 108. In the top surface of the second substrate member 110, an ejection port 111 for ejecting a liquid as droplets is formed. As one example of the first support substrate 102, the first substrate member 106, and the second substrate member 110, for example, there is a silicon substrate. In the first support substrate 102, a concave portion 112 concave from the top surface of the first support substrate 102 toward the bottom surface is formed. Further, at the position different from the concave portion 112 of the first support substrate 102, a first flow path 113 is formed, which penetrates through the first support substrate 102, the elastic member 101, and part of the first substrate member 106 on the bottom surface side.

In the elastic member 101, a first opening 114 for causing the first flow path 113 to communicate with the first substrate member 106 from the first support substrate 102 is formed. As one example of a method of forming the first opening 114 in the elastic member 101, there is dry etching. The elastic member 101 includes a resin. As one example of the resin included in the elastic member 101, for example, there is polyimide, polyamide or the like.

Further, the bottom surface of the elastic member 101 is bonded to the top surface of the first support substrate 102 so as to cover the concave portion 112. According to the configuration such as this, in a case where an external force is applied to the elastic member 101 due to pressure variations, to be described later, or the like, it is possible for the elastic member 101 to deform elastically toward the concave portion 112. Of course, it is also possible for the elastic member 101 to return to the original shape from the elastically deformed shape by an elastic restoring force.

In the first substrate member 106, a plurality of second flow paths 115 communicating with the first opening 114 and a third flow path 116 communicating individually with each of the plurality of the second flow paths 115 are formed. In the first substrate member 106, a plurality of the accommodation spaces 107 whose ceiling surface is the vibration plate 108 is arrayed in the Y-direction. In each of the accommodation spaces 107, a plurality of the piezoelectric elements 109 arranged at the bottom surface of the vibration plate 108 is accommodated.

In the vibration plate 108, a vibration plate opening 117 causing the third flow path 116 to communicate with the second substrate member 110 from the first substrate member 106 is formed. In the second substrate member 110, a plurality of pressure chambers 118 whose bottom surface is the vibration plate 108 is formed. In the second substrate member 110, a plurality of the ejection ports 111 communicating with each of the plurality of the pressure chambers 118 is arrayed in the Y-direction.

According to the configuration such as this, in a case where a liquid is ejected from the first liquid ejection substrate 100, the liquid supplied from the first flow path 113 to the second flow path 115 through the first opening 114. The liquid supplied to the second flow path 115 is supplied to the pressure chamber 118 through the third flow path 116 and the vibration plate opening 117.

The piezoelectric element 109 changes the volume within the pressure chamber 118 by elastically deforming the vibration plate 108 in accordance with an electric signal received from a liquid ejection apparatus main body (not shown schematically). Due to this, in the pressure chamber 118, pressure variations occur, and therefore, the liquid within the pressure chamber 118 is pressurized and liquid droplets (for example, ink droplets) are ejected in the +Z-direction from the ejection port 111. The liquid that is not ejected from the ejection port 111 is collected.

In a case where pressure variations occur, by the elastic member 101, which forms one wall surface of the second flow path 115, deforming elastically toward the concave portion 112, the pressure variations are damped. That is, the entire second flow path 115 functions as a damper. According to the configuration such as this, it is possible to relax the pressure variations for the ejection port other than the ejection port at which the ejection operation has been performed and lessen the influence of crosstalk.

Figure 2:
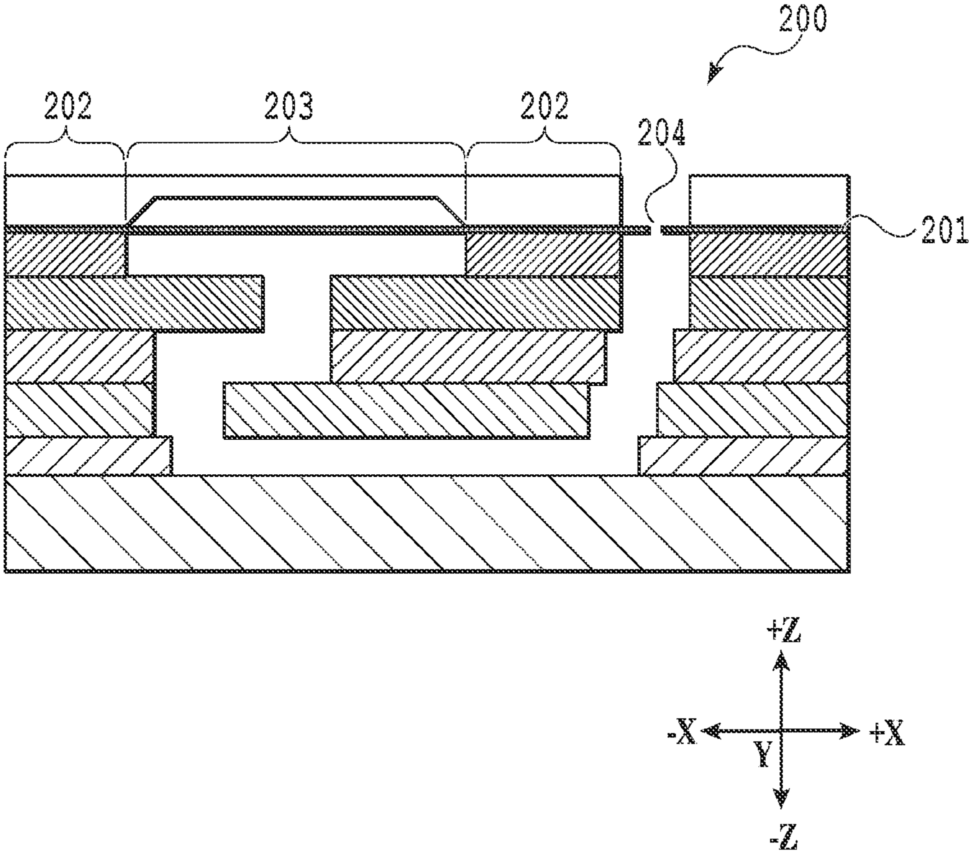
FIG. 2 is a diagram showing a configuration for a comparison with the present invention.

FIG. 2 is a diagram showing the configuration of Japanese Patent Laid-Open No. 2006-095725 for a comparison with the present embodiment. In Japanese Patent Laid-Open No. 2006-095725, a nozzle plate 201 in which an ejection port 204 is formed is caused to function as an elastic member and a second area 203 communicating with the ejection port 204 is caused to function as a damper. However, the volume of the second area 203 functioning as a damper in the configuration of Japanese Patent Laid-Open No. 2006-095725 is small compared to that of the second flow path 115 (see FIG. 1) functioning as a damper in the configuration of the present embodiment. Because of this, with the configuration of Japanese Patent Laid-Open No. 2006-095725, it becomes difficult to sufficiently suppress the influence of crosstalk in the situation in which the high density of the ejection port is demanded. That is, according to the configuration of the present embodiment, it is possible to further increase the density of the ejection port more than ever in the state where the influence of crosstalk is suppressed.

However, in a case where a comparatively large damper area is formed by using a sheet-shaped elastic member as in the present embodiment, it is required to firmly fix the elastic member, which deforms by pressure variations.

Figure 3:
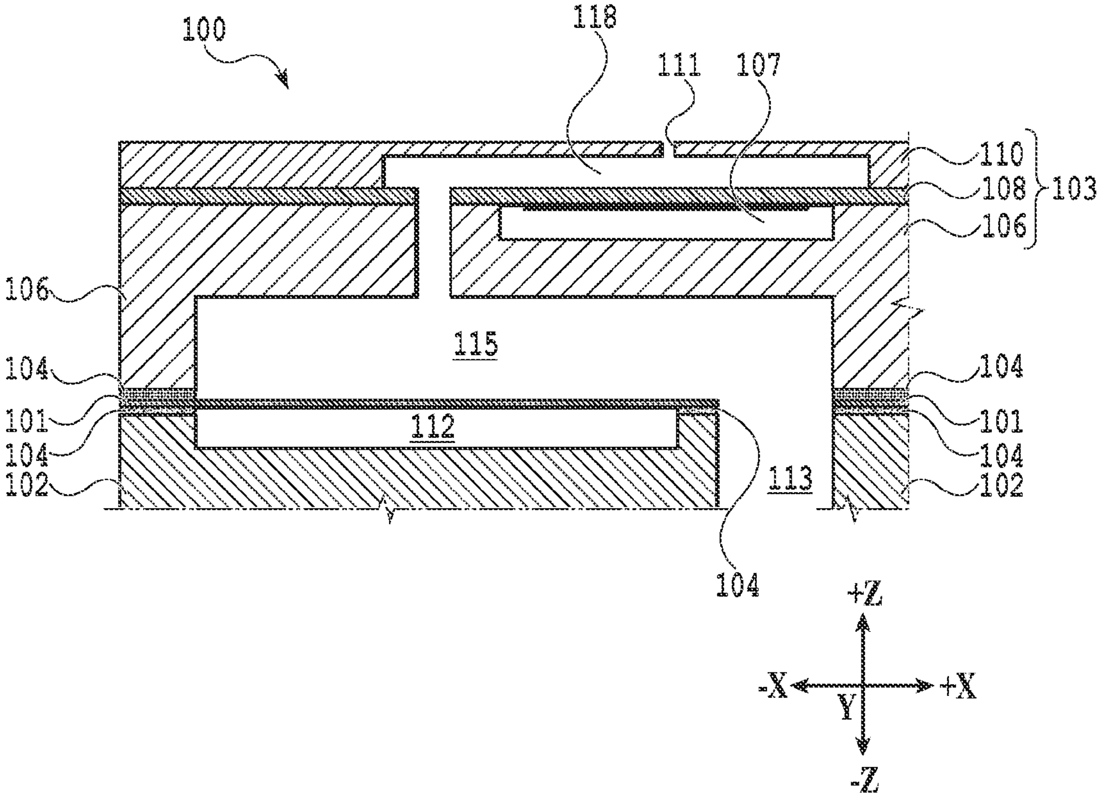
FIG. 3 is a diagram for explaining a bonding state of an elastic member.

FIG. 3 is a diagram for explaining the bonding state of the elastic member 101. FIG. 3 corresponds to a diagram in a case where the first liquid ejection substrate 100 is viewed from the +Y-direction in FIG. 1.

As shown in FIG. 3, in the first liquid ejection substrate 100, the first support substrate 102, the first substrate member 106, and the second substrate member 110 are laminated via a bonding member. In the first support substrate 102, the first flow path 113 is formed, which is a liquid supply flow path. In the first substrate member 106 included in the second support substrate 103, the second flow path 115 capable of storing the liquid supplied from the first flow path 113 is formed. In the second substrate member 110, a plurality of the pressure chambers 118 communicating with the second flow path 115 is formed. In the second substrate member 110 included in the second support substrate 103, a plurality of the ejection ports 111 arranged in each of the pressure chambers 118 and capable of ejecting the liquid stored in the pressure chamber 118 is formed. Part of the wall surface of the second flow path 115 is formed by the sheet-shaped elastic member 101 spread in the hollow portion (that is, space formed by the concave portion 112 and the second flow path 115) defined by the first support substrate 102 and the first substrate member 106.

Figure 4:
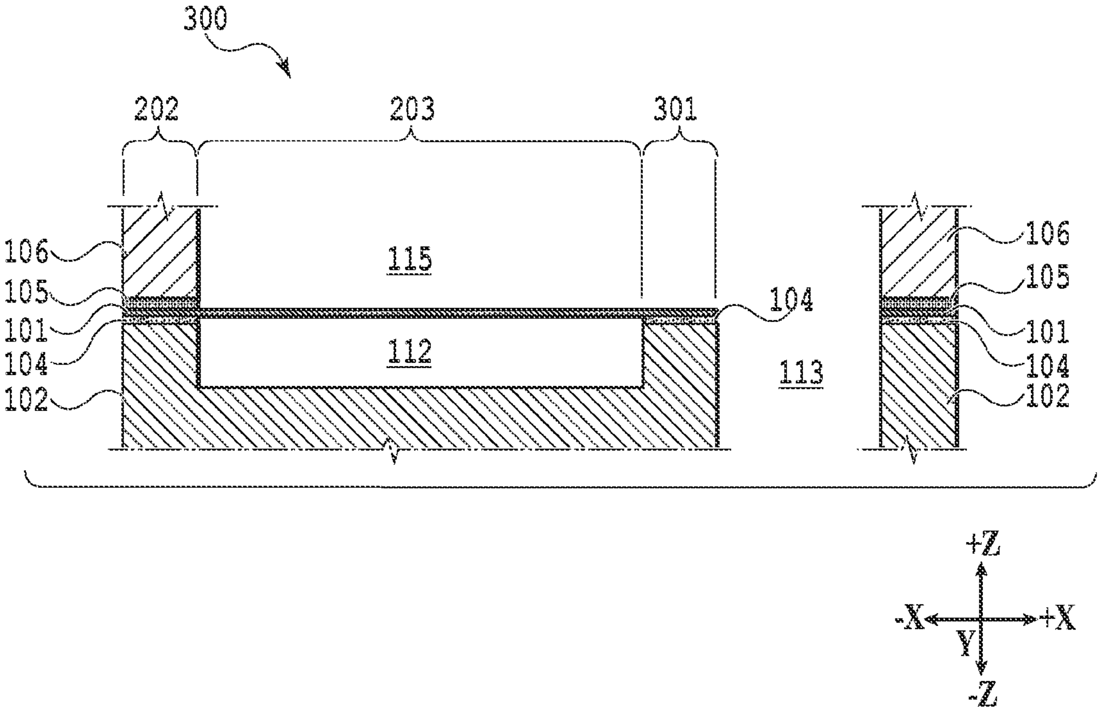
FIG. 4 is a schematic enlarged diagram of the vicinity of an area functioning as a damper.

FIG. 4 is a schematic enlarged diagram of the vicinity of the area functioning as a damper shown in FIG. 3. Here, for convenience, the elastic member 101 is divided into a first area 202 bonded to the first support substrate 102 and the first substrate member 106, a second area 203 forming part of the second flow path 115, and a third area 301 bonded to the first support substrate 102. Among these areas, in the third area 301, the top surface side of the elastic member 101 is not supported by a member. Because of this, in a case where the elastic member 101 deforms elastically, there is a possibility that the elastic member 101 peels off from the first support substrate 102. In a case where the elastic member 101 peels off from the first support substrate 102, the function as a damper of the elastic member 101 is reduced. With the above situation in mind, in the present embodiment, a characteristic bonding method is performed in the third area 301.

<Aspect in which Bonding Member is Caused to Stick to Three Surfaces of Elastic Member>

Figure 5A:
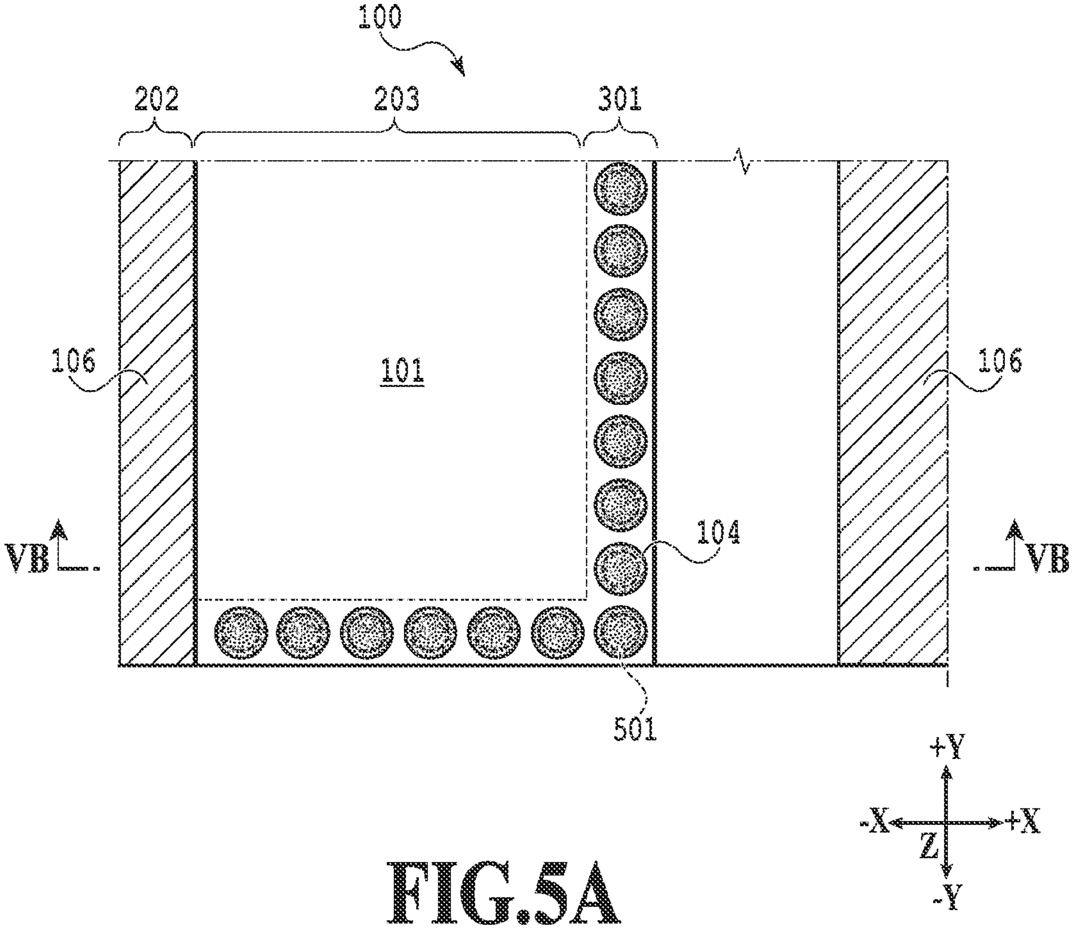
FIG. 5A and FIG. 5B are each a schematic diagram showing the way an elastic member is fixed in the present embodiment.
Figure 5B:
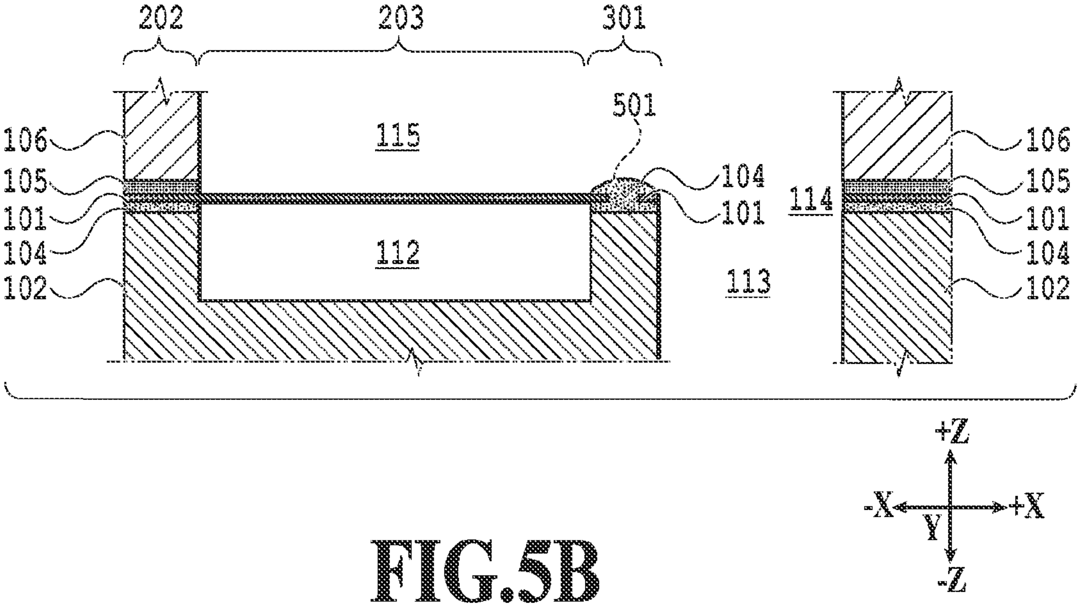

FIG. 5A and FIG. 5B are each a schematic diagram showing the way the elastic member 101 in the present embodiment is fixed.

FIG. 5A is schematic cross-sectional plan diagram of the first liquid ejection substrate 100 in the present embodiment. As shown in FIG. 5A, in the third area 301 in the present embodiment, one or more second openings 501 having the shape of a ring are formed. As one example of a method of forming the second opening 501 in the elastic member 101, there is dry etching. The position of the second opening 501 is not limited as long as it is located within the third area 301. In the third area 301, the first bonding member 104 passes through the second opening 501 and bulges out and spreads on the top surface of the elastic member 101.

FIG. 5B is a cross-sectional diagram along a Vb-Vb line in FIG. 5A.

As shown in FIG. 5B, the elastic member 101 has the first opening 114 and the second opening 501 as the opening. The first opening 114 causes the first flow path 113 and the second flow path 115 to communicate with each other in the state where the first support substrate 102 and the second support substrate 103 are bonded to each other.

The elastic member 101 has the first area 202 that is supported by being sandwiched between the first support substrate 102 and the first substrate member 106. Then, the elastic member 101 covers the concave portion 112 and has the second area 203 that is not supported by the first support substrate 102 or the first substrate member 106 and capable of deforming elastically toward the concave portion 112 upon receipt of an external force. The second area 203 functions as a damper area for damping the pressure variations that occur at the time of liquid ejection.

Further, the elastic member 101 has the third area 301 whose bottom surface is supported by the first support substrate 102 and whose top surface is not supported. In the third area 301 in the present embodiment, the first bonding member 104 applied to the top surface of the first support substrate 102 passes through the second opening 501, which is a through hole formed in the bonding surface with the first support substrate 102, and spreads on the top surface of the elastic member 101.

Due to this, in the third area 301, the first bonding member 104 sticks to the bottom surface of the elastic member 101, the inner circumferential surface of the second opening 501, and the top surface of the elastic member 101. That is, the first bonding member 104 spreads on the top surface of the elastic member 101 after flowing into the second opening 501, and therefore, the first bonding member 104 fixes the elastic member 101 like an anchor. In the present example, by the plurality of the second openings 501 being formed in the third area 301, the anchor effect of the first bonding member 104 is promoted.

That is, in the area functioning as a damper of the elastic member 101, one end portion (the first area 202) is bonded between the first support substrate 102 and the first substrate member 106 by the first bonding member 104 and the second bonding member 105. Further, the other end portion (the third area 301) is bonded to the first support substrate 102 in the state where the first bonding member 104 sticks to the elastic member 101 continuously from the bottom surface of the elastic member 101 to the inner circumferential surface of the second opening 501 and further bulges out onto the top surface.

According to the configuration such as this, it is possible to increase the bonding area between the first support substrate 102 and the elastic member 101. Due to this, it is possible to improve the bonding strength between the first support substrate 102 and the elastic member 101 in the third area 301 more than ever. Consequently, according to the liquid ejection substrate of the present invention, compared to the state where the elastic member 101 is supported on the first support substrate 102 simply with the first bonding member 104 being sandwiched as in FIG. 4, it is possible to bond the elastic member 101 to the first support substrate 102 more firmly. As a result of that, even in a case where the elastic member 101 of the second area 203 varies between the concave shape and the convex shape accompanying the ejection operation, it is possible to suppress the elastic member 101 from peeling off from the substrate member.

Further, it is possible to accommodate the excessive first bonding member 104 in the second opening 501, and therefore, it is also possible to adjust the amount of the first bonding member 104 bulging out to the outside of the third area 301. Due to this, it is also possible to suppress the function as a damper of the second area from being blocked by the first bonding member 104 sticking to the second area 203.

<Bonding Member>

In the following, the first bonding member 104 and the second bonding member 105 are explained. In a case where it is not necessary to particularly distinguish between the first bonding member 104 and the second bonding member 105, they are simply described as "bonding member". Further, in a case where it is not necessary to particularly distinguish between the first support substrate 102, the first substrate member 106, and the second substrate member 110, they are simply described as "flow path substrate".

As the bonding member, it is possible to use an organic or inorganic material. Depending on the material that is used as the flow path substrate, there is a case where degeneration at high temperatures brings about a problem, and therefore, it is preferable to use an organic material capable of bonding at comparatively low temperatures because the degree of freedom of the material of the flow path substrate is increased. As the organic bonding member, a viscous member may be used, but it is preferable to use a material that solidifies in the bonding state because the bonding strength is increased easily. A thermoplastic material is preferable because it is a member that solidifies as temperature goes down after being softened by heat and closely adhered, and handling thereof is easy. A material that hardens by a chemical reaction after bonding is preferable because the bonding strength is increased easily. A thermohardening material is preferable because control of a hardening reaction is easy.

As the material of the bonding member, it is possible to use epoxy, acryl, urethane, silicone, benzocyclobutene, polyimide, polyamide, polyamide-imide, cyanoacrylate, phenol, melamine, styrene, cyclized rubber, or a mixture thereof, and the like. Among these, a resin whose main component is epoxy, silicone, benzocyclobutene, or polyimide is preferable because of its excellent chemical resistance.

The type of epoxy is not limited particularly. For example, it is possible to use bisphenol-type epoxy, novolac-type epoxy, epoxy polyol-type epoxy, alicyclic epoxy, glycidyl-type epoxy, urethane modified epoxy, chelate modified epoxy, rubber modified epoxy, or a mixture thereof.

Silicone is not limited particularly. For example, it is possible to use condensed silicone or addition-type silicone. Among them, addition-type silicone with less hardening shrinkage is preferable. For example, it is possible to use epoxy modified silicone, acryl modified silicone, methyl-based silicone, phenyl-based silicone, methylphenyl-based silicone, alkyd modified silicone, polyester modified silicone, or a mixture thereof.

Polyimide is not limited particularly. It may also be possible to use polyimide having thermoplasticity in the form of a film. Polyamide acid may be used as a precursor. In a case where hardening is caused to take place after bonding by using a precursor, it is easy to increase the bonding strength, and therefore, preferable.

A filler may be added to the bonding member. For example, a fibrous filler is preferable because the effect of suppressing a defect, such as a break in the bonding member, is comparatively high. As one example of a fibrous filler, there is carbon fiber, metal fiber, glass fiber, cellulose fiber or the like.

The flow path substrate may have a function layer in order to increase chemical resistance, or increase the bonding force with the bonding member. The function layer may be arranged at part of the flow path substrate. The function layer may be arranged on the entire surface of the flow path substrate. A coupling agent may be arranged between the first support substrate 102 and the elastic member 101. By selecting a coupling agent suitable to the substrate material or the function layer material, and the bonding member, it is possible to form a covalent bond, and therefore, the effect of increasing the bonding force is obtained. Of course, the coupling agent may be arranged between the elastic member 101 and the first substrate member 106.

<Manufacturing Method of Liquid Ejection Substrate>

FIG. 6A to FIG. 6F are each a diagram for explaining an example of the manufacturing process of the first liquid ejection substrate 100 in the present embodiment.

Figures 6A, 6B, 6C, 6D, 6E, 6F:
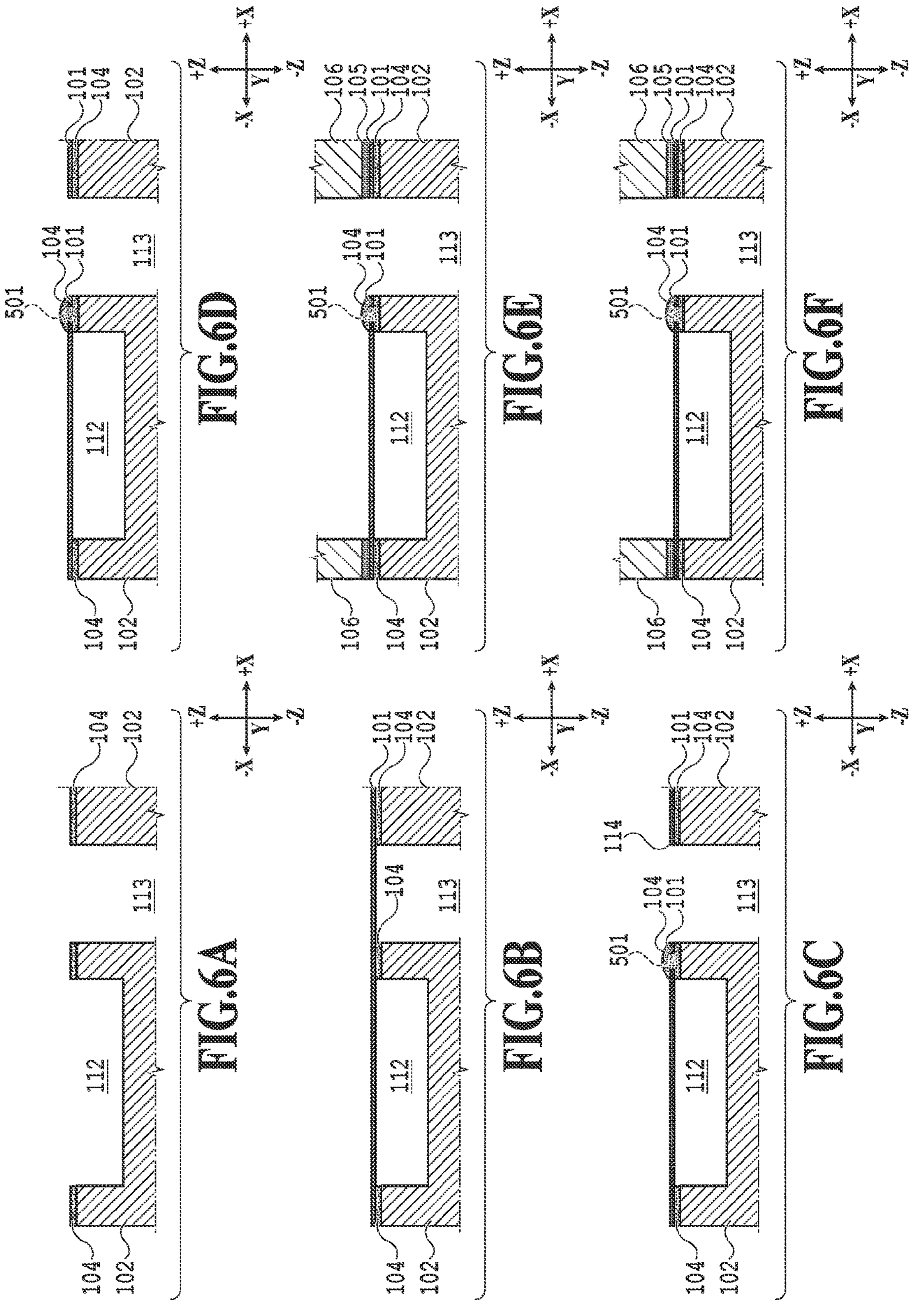
FIG. 6A to FIG. 6F are each a diagram for explaining an example of a manufacturing process of a first liquid ejection substrate in the present embodiment.

FIG. 6A is a diagram showing the first process. In the first support substrate 102, the concave portion 112 and the first flow path 113 are formed. At this point in time, the first flow path 113 is a through hole penetrating through the first support substrate 102. As shown in FIG. 6A, in the first process, the first bonding member 104 before hardening is applied to the area in which the concave portion 112 or the first flow path 113 is not formed on the surface in which the concave portion 112 in the first support substrate 102 is formed. As the method of applying the first bonding member 104 before hardening, the method for a general resin member is used. For example, in a case where the first bonding member 104 is applied to the entire surface of the first support substrate 102, the application is performed by spin coat, spray or the like. In a case where the first bonding member 104 is applied to part of the first support substrate 102, the application is performed by a dispenser, screen printing, transferring a bonding member in the form of a dry film, or the like.

FIG. 6B is a diagram showing the second process. As shown in FIG. 6B, in the second process, the sheet-shaped elastic member 101 is placed on the first bonding member 104 and the first support substrate 102 and the elastic member 101 are bonded to each other by the first bonding member 104. In a case where the first support substrate 102 and the elastic member 101 are bonded, appropriate temperature, pressure, or time is selected in accordance with the structure or thickness of the first support substrate 102, the material of the first bonding member 104, and the like. There is a case where the first bonding member 104 is affected by oxygen or the like in the atmosphere, and therefore, it is preferable for the first support substrate 102 and the elastic member 101 be bonded under reduced pressure.

FIG. 6C is a diagram showing the third process. As shown in FIG. 6C, in the third process, in the elastic member 101, the first opening 114 and the second opening 501 are formed. As one example of a method forming the first opening 114 and the second opening 501, there is a method of forming them by performing dry etching using a mask material (not shown schematically). In a case where the elastic member 101 is a photosensitive resin, a method may be used in which patterning is performed by exposure. The second opening 501 is formed in the third area 301, and therefore, part of the first bonding member 104 before hardening flows into the inside of the second opening 501. Further, inside the second opening 501, part of the first bonding member 104 before hardening flows on the top surface of the elastic member 101 due to the capillary phenomenon. On the top surface of the elastic member 101, part of the first bonding member 104 before hardening, which has passed through the second opening 501, flows out in a spreading manner.

FIG. 6D is a diagram showing the fourth process. As shown in FIG. 6D, in the fourth process, the first bonding member 104 is hardened. In the fourth process, it is possible to obtain the effect of increasing the bonding force by hardening the first bonding member 104 using a chemical reaction. In order to harden the first bonding member 104, it is possible to select temperature, time, atmosphere or the like in accordance with the material of the first bonding member 104. As one example of a method of adjusting the flow of the first bonding member 104, there is a method in which the first support substrate 102 is irradiated with electromagnetic waves or the like for rapid heating. As another example, there is a method of hardening the first bonding member 104 by irradiating the first bonding member 104 with electromagnetic waves or the like through the first support substrate 102.

FIG. 6E is a diagram showing the fifth process. As shown in FIG. 6E, in the fifth process, the first substrate member 106 to the inner circumferential portion of the base surface of which the second bonding member 105 is applied, and the elastic member 101 are bonded to each other. In the fifth process, appropriate temperature, pressure, or time is selected in accordance with the structure or thickness of the first substrate member 106, or the material and the like of the second bonding member 105. There is a case where the second bonding member 105 is affected by oxygen or the like in the atmosphere, and therefore, it is preferable to perform bonding under reduced pressure.

FIG. 6F is a diagram showing the sixth process. As shown in FIG. 6F, in the sixth process, the second bonding member 105 is hardened. In the sixth processing, it is possible to obtain the effect of increasing the bonding force by hardening the second bonding member 105 using a chemical reaction. In order to harden the second bonding member 105, it is possible to select temperature, time, atmosphere or the like in accordance with the material of the second bonding member 105. As one example of a method of adjusting the flow of the second bonding member 105, there is a method in which the first substrate member 106 is irradiated with electromagnetic waves or the like for rapid heating. As another method, there is a method of hardening the second bonding member 105 by irradiating the second bonding member 105 with electromagnetic waves or the like through the first substrate member 106.

First Embodiment

In the following, an embodiment of the manufacturing method shown in FIG. 6A to FIG. 6F is explained. In the following, explanation is given with reference to FIG. 6A to FIG. 6F, but only one technically preferred example is explained. Particularly, the technical scope of the present invention is not limited.

As shown in FIG. 6A, as the first support substrate 102, a silicon substrate 625 μm long is prepared. Onto both sides of the silicon substrate, a positive resist is exposed and developed. After that, by dry etching, the concave portion 112 300 μm deep and 300 μm wide and the first flow path 113 200 μm wide are formed. After that, the first bonding member 104 before hardening, whose thickness is 2 μm, is formed into a dry film and transferred onto the first support substrate 102. In the present embodiment, as the first bonding member 104, a thermohardening resin is applied.

Next, as shown in FIG. 6B, the first support substrate 102 and the elastic member 101 are bonded to each other via the first bonding member 104 before hardening. As the elastic member 101, for example, a polyimide film 3 μm thick is used. By the lamination method, the elastic member 101 is formed while applying pressure. The temperature of the laminate is set to temperatures at which the first bonding member 104 before hardening does not harden.

Next, as shown in FIG. 6C, on the elastic member 101, a mask pattern (not shown schematically) is formed. After that, the first opening 114 and the second opening 501 are formed by the reactive dry etching method generally known, which uses a mixed gas of CF4 gas (tetrafluoromethane gas) and oxygen gas. By the second opening 501 being formed in the third area 301, part of the first bonding member 104 before hardening flows into the inside of the second opening 501. Further, part of the first bonding member 104 before hardening, which has flowed inside and then passed through the second opening 501, flows out so as to spread on the top surface of the elastic member 101.

Next, as shown in FIG. 6D, the first bonding member 104 before hardening is hardened. Here, heat treatment at 250° C. is performed by using an oven in the nitrogen atmosphere.

Next, as shown in FIG. 6E, the first substrate member 106 to which the second bonding member 105 before hardening is applied and the elastic member 101 are bonded to each other. As the first substrate member 106, for example, a silicon substrate is used. In this manner, the first substrate member 106 as shown in FIG. 5B and the second substrate member 110 are created. Further, as the second bonding member 105, a thermohardening epoxy resin 40 μm thick is applied by the dispense method.

Next, as shown in FIG. 6F, the second bonding member 105 is hardened. Here, heat treatment at 160° C. is performed by using an oven in the nitrogen atmosphere.

The first liquid ejection substrate 100 manufactured as above is attached to a liquid ejection head and the ejection operation was performed for a predetermined period of time by using the liquid ejection head. At that time, during the predetermined period of time, it was possible to perform the stable ejection operation. Further, after the ejection operation, no peeling was found in the elastic member 101 of the first liquid ejection substrate 100.

<Conclusion>

As explained above, according to the first liquid ejection substrate 100 in the present embodiment, it is possible to provide a damper area whose capacity is larger than before under the ejection ports arrayed densely. After that, the first bonding member 104 is caused to stick continuously to the bottom surface of the elastic member 101 functioning as a damper, the inner circumferential surface of the second opening 501, and the top surface of the elastic member 101. According to the configuration such as this, at least two surfaces (in the present embodiment, three surfaces) of the plurality of surfaces of the elastic member 101 are fixed by the first bonding member 104. That is, the elastic member 101 is fixed from the three directions (+Z-direction, −X-direction, and −Z-direction). Because of this, it is possible to improve the bonding strength between the first support substrate 102 and the elastic member 101 in the third area 301 more than ever.

Consequently, according to the liquid ejection substrate of the present invention, it is possible to suppress the elastic member from peeling off from the substrate member. That is, according to the technique of the present invention, it is possible to fix the elastic member firmly.

Further, the excessive first bonding member 104 is accommodated inside the second opening 501. Due to this, it is also possible to fix the elastic member 101 while adjusting the amount of the first bonding member 104 bulging out to the outside of the third area 301. As a result of that, it is possible to further increase the density of the ejection ports more than ever in the state where the influence of crosstalk is suppressed.

Modification Example 1 of First Embodiment

<Aspect in which Bonding Member is Stuck Continuously to Two Surfaces of Elastic Member>

Figure 7:
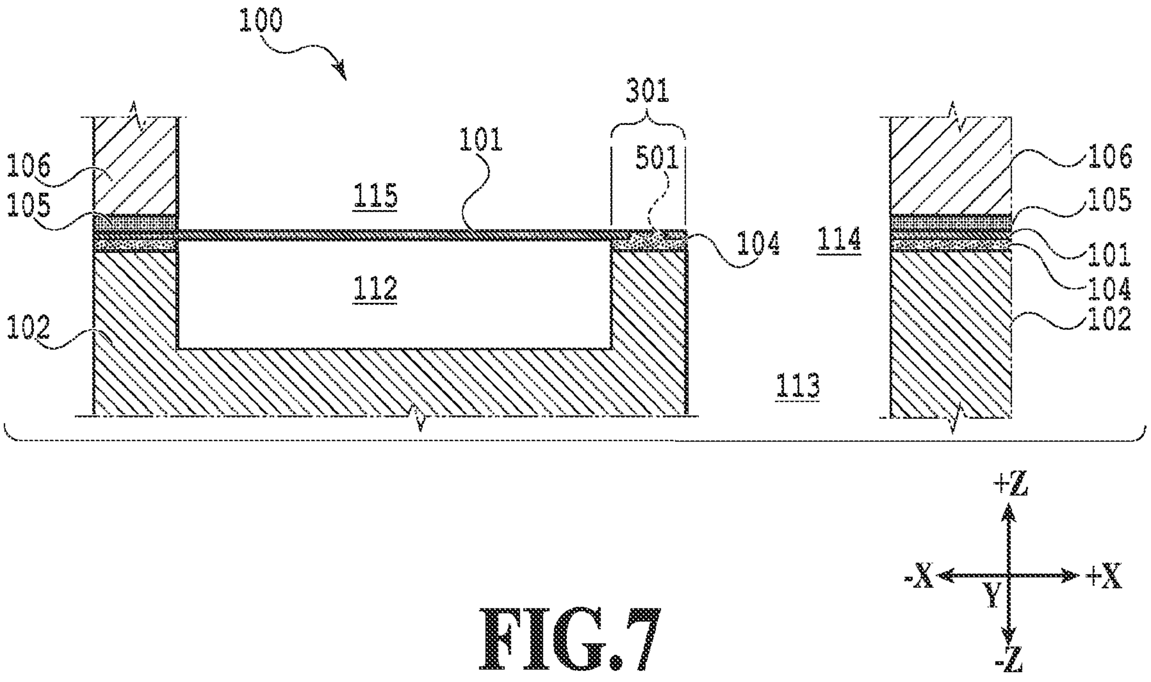
FIG. 7 is a diagram showing a modification example of a liquid ejection substrate.

FIG. 7 is a diagram showing the first liquid ejection substrate 100 in the present modification example.

As shown in FIG. 7, in the third area 301, the first bonding member 104 flows into the inner circumferential surface of the second opening 501. However, the first bonding member 104 does not stick to the top surface of the elastic member 101.

With the configuration such as this, it is also possible to accommodate the excessive first bonding member 104 inside the second opening 501.

Modification Example 2 of First Embodiment

Figure 8:
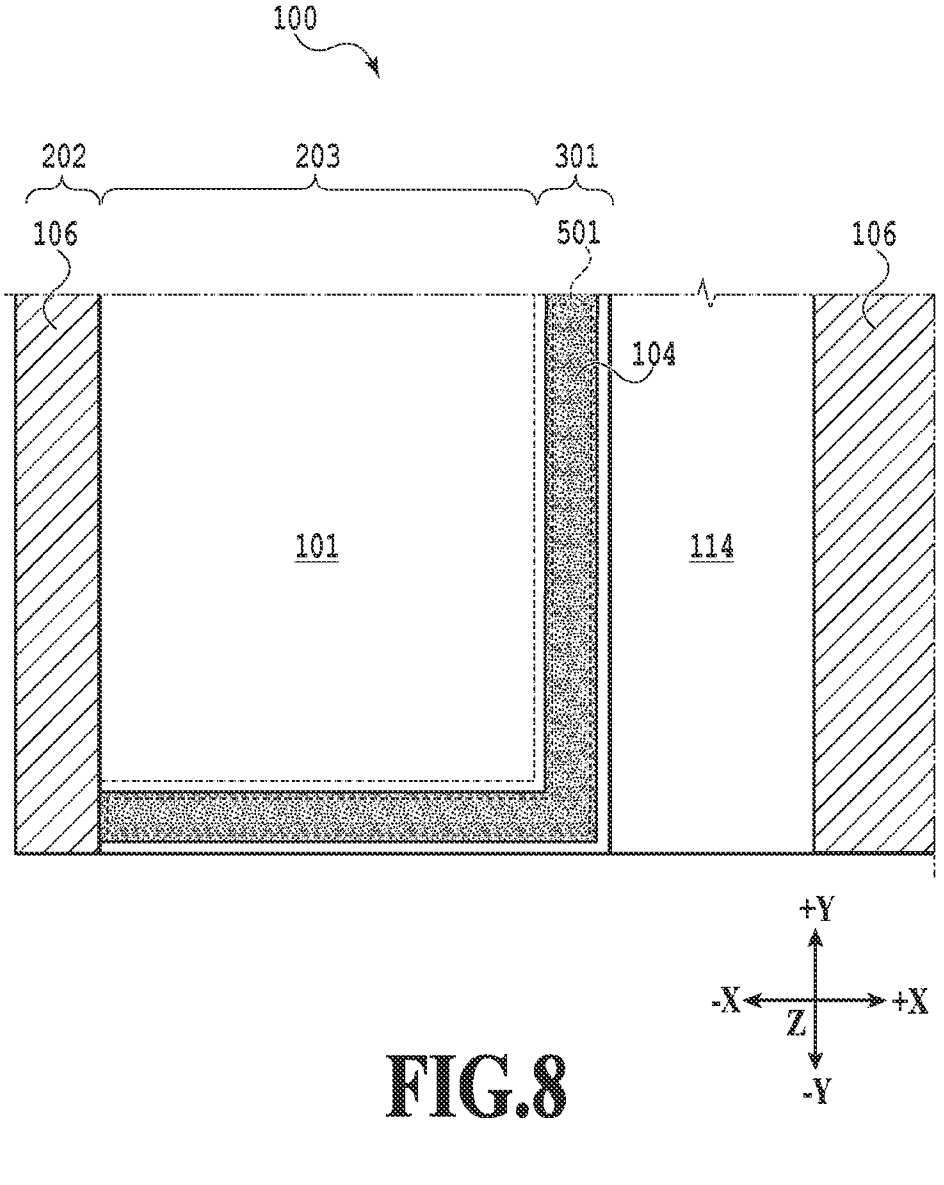
FIG. 8 is a diagram showing a modification example of a liquid ejection substrate.

FIG. 8 is a diagram showing the first liquid ejection substrate 100 in the present modification example.

As shown in FIG. 8, the elastic member 101 of the present modification example has the one second opening 501 in the shape of an approximate L letter, which is formed continuously along the inside of the third area 301. That is, the second opening 501 in the present modification example is an opening extending along the bonding surface with the first support substrate 102 (see FIG. 1) in the third area 301.

According to the configuration such as this, the bonding area between the elastic member 101 and the first bonding member 104 (see FIG. 1) increases compared to that in the example in FIG. 5A. Consequently, according to the elastic member 101 in the present modification example, it is possible to further suppress the elastic member 101 from peeling off from the first support substrate 102 (see FIG. 1).

Second Embodiment

In the following, with reference to the drawings, a second embodiment in the technique of the present invention is explained. In the following explanation, for the configuration the same as or corresponding to that of the first embodiment, the same symbols and names are used and explanation thereof is omitted appropriately and different points are explained mainly. The present embodiment differs from the first embodiment in that the second opening is not formed. An object of the present embodiment is to suppress the elastic member from peeling off from the first support substrate with a simpler configuration.

Figure 9:
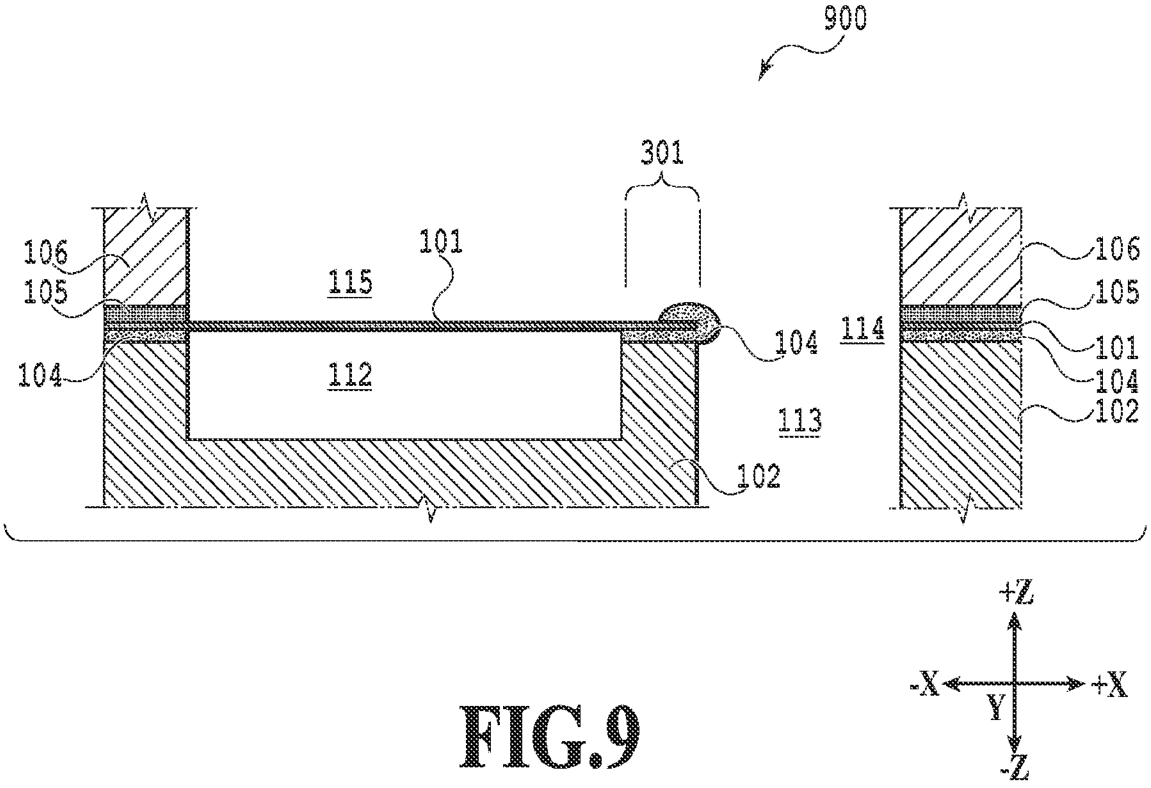
FIG. 9 is a schematic cross-sectional front diagram of a liquid ejection substrate in one embodiment.

FIG. 9 is a schematic cross-sectional front diagram of a second liquid ejection substrate 900 in the present embodiment.

As shown in FIG. 9, in the present embodiment, the first bonding member 104 sticks continuously to the bottom surface of the elastic member 101, the inner circumferential surface of the first opening 114, and the top surface of the elastic member 101. In the present embodiment, the second opening is not formed in the elastic member 101. According to the configuration such as this, even though the second opening is not provided, the elastic member 101 is fixed from three directions.

Consequently, according to the second liquid ejection substrate 900, with the configuration simpler than that of the first embodiment, it is possible to suppress the elastic member 101 from peeling off from the first support substrate 102. That is, according to the liquid ejection substrate of the present embodiment, with the configuration simpler than that of the first embodiment, it is possible to fix the elastic member firmly.

Modification Example of Second Embodiment

Figure 10:
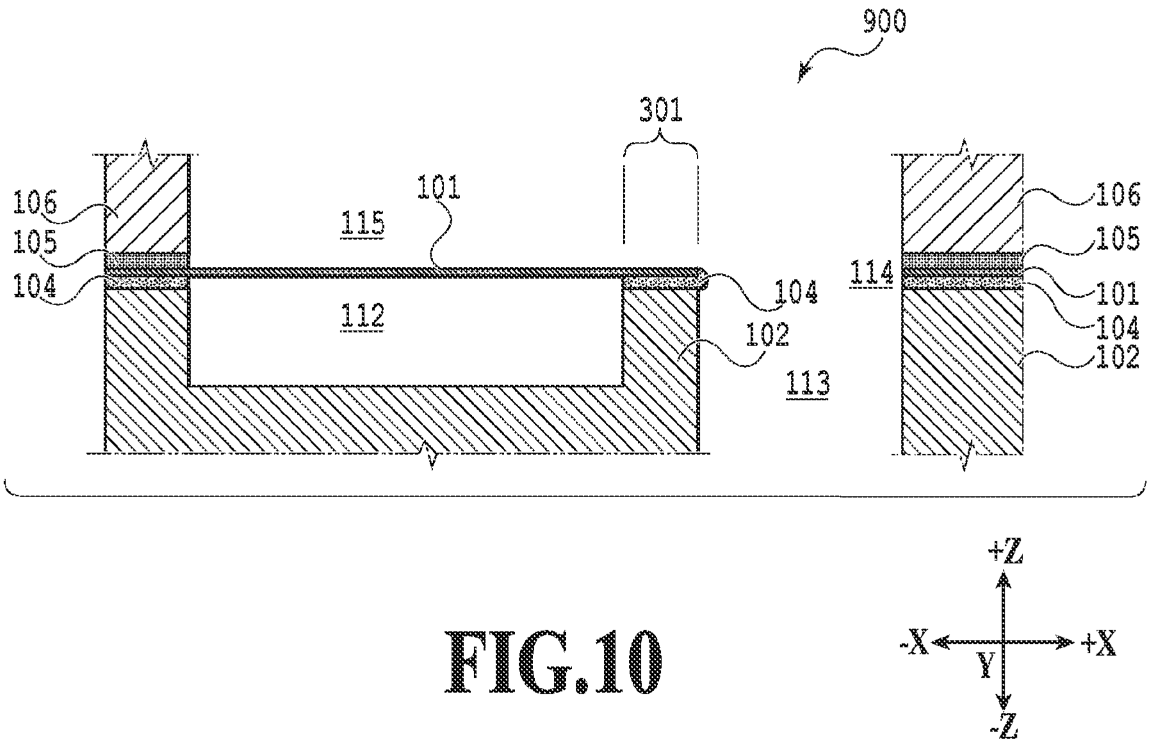
FIG. 10 is a diagram showing a modification example of a liquid ejection substrate.

FIG. 10 is a diagram showing the second liquid ejection substrate 900 in the present modification example.

As shown in FIG. 10, in the present example, the size of the inner wall of the first flow path 113 and the inner diameter of the first opening 114 are the same, and therefore, in the state where the first support substrate 102 and the elastic member 101 are bonded to each other, the first flow path 113 and the first opening 114 communicate with each other.

According to the configuration such as this, the first bonding member 104 fixes the bottom surface of the elastic member 101 and the inner circumferential surface of the first opening 114. However, the first bonding member 104 does not fix the top surface of the elastic member 101. Consequently, according to the second liquid ejection substrate 900 in the present modification example, it is possible to fix the elastic member 101 with an amount smaller than that in the example in FIG. 9.

Third Embodiment

In the following, with reference to the drawings, a third embodiment in the technique of the present invention is explained. In the following explanation, for the configuration the same as or corresponding to that of the first embodiment or the second embodiment, the same symbols and names are used and explanation thereof is omitted appropriately and different points are explained mainly. The present embodiment differs from the first embodiment in that the second opening 501 is not formed.

Figure 11:
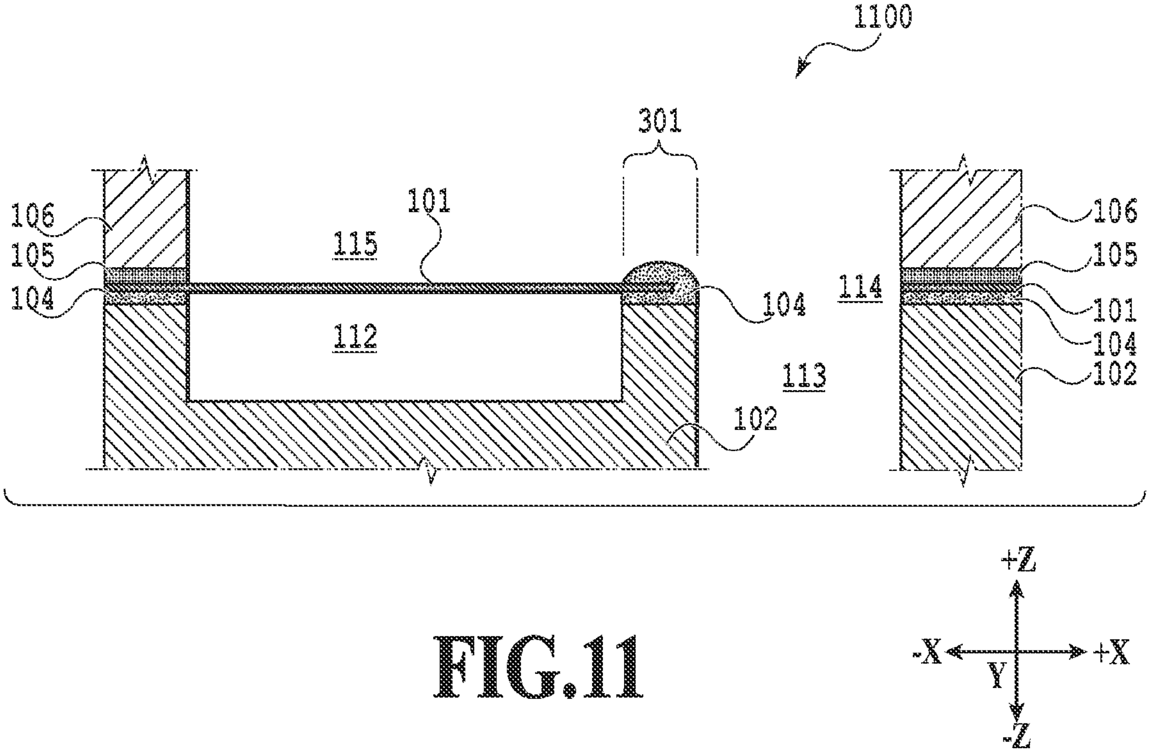
FIG. 11 is a schematic cross-sectional front diagram of a liquid ejection substrate in one embodiment.

FIG. 11 is a schematic cross-sectional front diagram of a third liquid ejection substrate 1100 in the present embodiment.

As shown in FIG. 11, in the elastic member 101, the second opening is not formed. The inner diameter of the first opening 114 is greater than the inner diameter of the first flow path 113. Part of the first opening 114 is located in the third area 301. The first bonding member 104 fixes the bottom surface of the elastic member 101, the inner circumferential surface of the first opening 114, and the top surface of the elastic member 101. In the present example, in a case where the first bonding member 104 fixes the inner circumferential surface of the first opening 114, the first bonding member 104 does not bulge out to the outside of the third area 301.

According to the configuration such as this, it is possible to fix the elastic member 101 from three directions without reducing the inner diameter of the first flow path 113 as in the example in FIG. 9. That is, according to the liquid ejection substrate of the present embodiment, it is possible to fix the elastic member more firmly.

Modification Example of Third Embodiment

Figure 12:
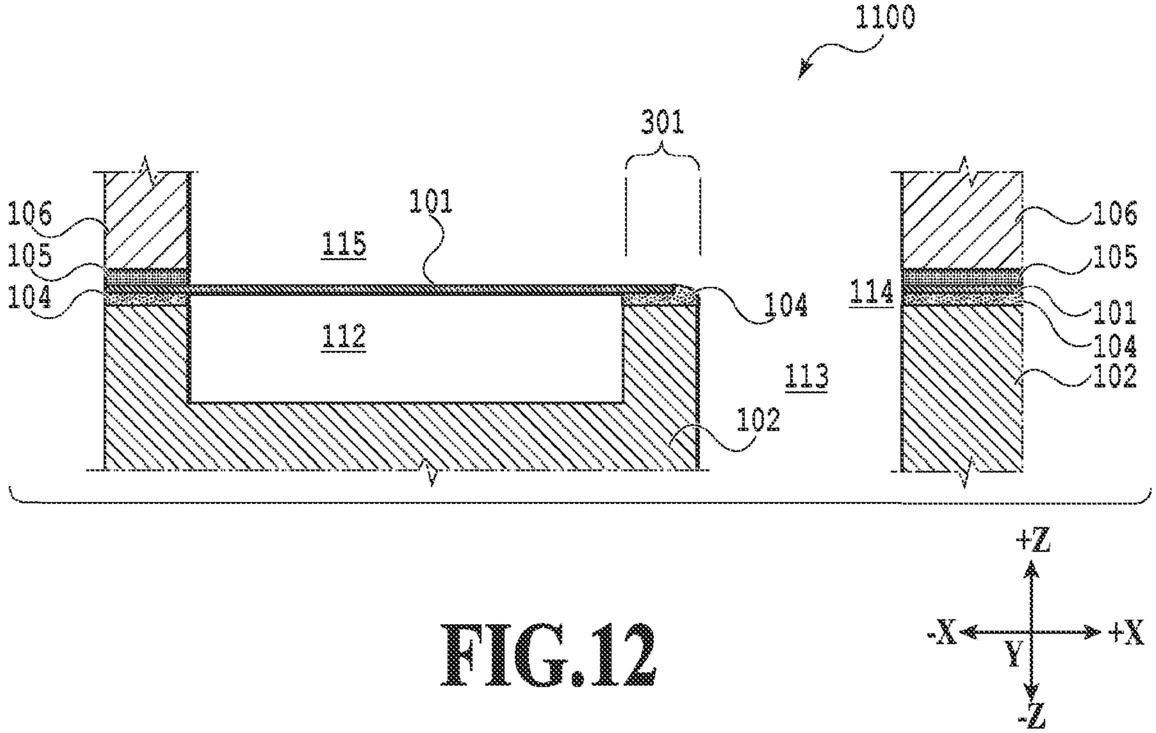
FIG. 12 is a diagram showing a modification example of a liquid ejection substrate.

FIG. 12 is a diagram showing the third liquid ejection substrate 1100 in the present modification example.

As shown in FIG. 12, the inner diameter of the first opening 114 is greater than the inner diameter of the first flow path 113. The first bonding member 104 fixes the inner circumferential surface of the first opening 114 whose inner diameter is formed greater than the inner diameter of the first flow path 113. However, the first bonding member 104 does not fix the top surface of the elastic member 101. That is, the amount of the first bonding member 104 in the present example is smaller than that in the example in FIG. 11. With the configuration such as this, it is also possible to fix the elastic member 101.

Consequently, according the third liquid ejection substrate 1100 of the present modification example, it is possible to fix the elastic member 101 with an amount smaller than that in the example in FIG. 11.

Fourth Embodiment

In the following, with reference to FIG. 13 to FIG. 15, a fourth embodiment in the technique of the present invention is explained. In the following explanation, for the configuration the same as or corresponding to that of the above embodiments, the same symbols and names are used and explanation thereof is omitted appropriately and different points are explained mainly. The present embodiment differs from the above embodiments in that a filter portion 1301 is formed in the elastic member 101. An object of the present embodiment is to cause the elastic member 101 to have the filter function and the damper function.

Figure 13:
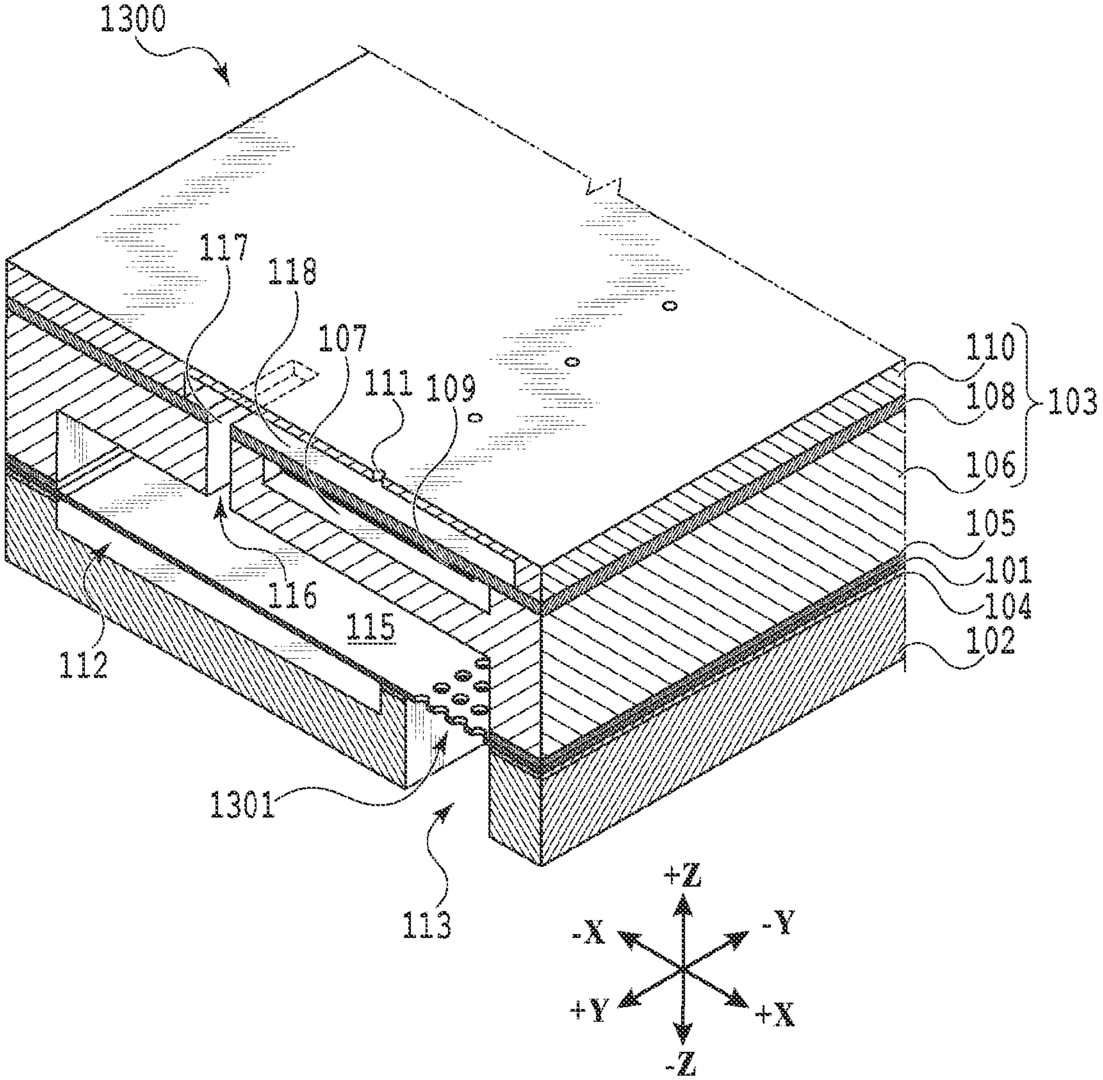
FIG. 13 is a schematic cross-sectional perspective diagram of a liquid ejection substrate in one embodiment.

FIG. 13 is a schematic cross-sectional perspective diagram of a fourth liquid ejection substrate 1300 in the present embodiment.

Figure 14:
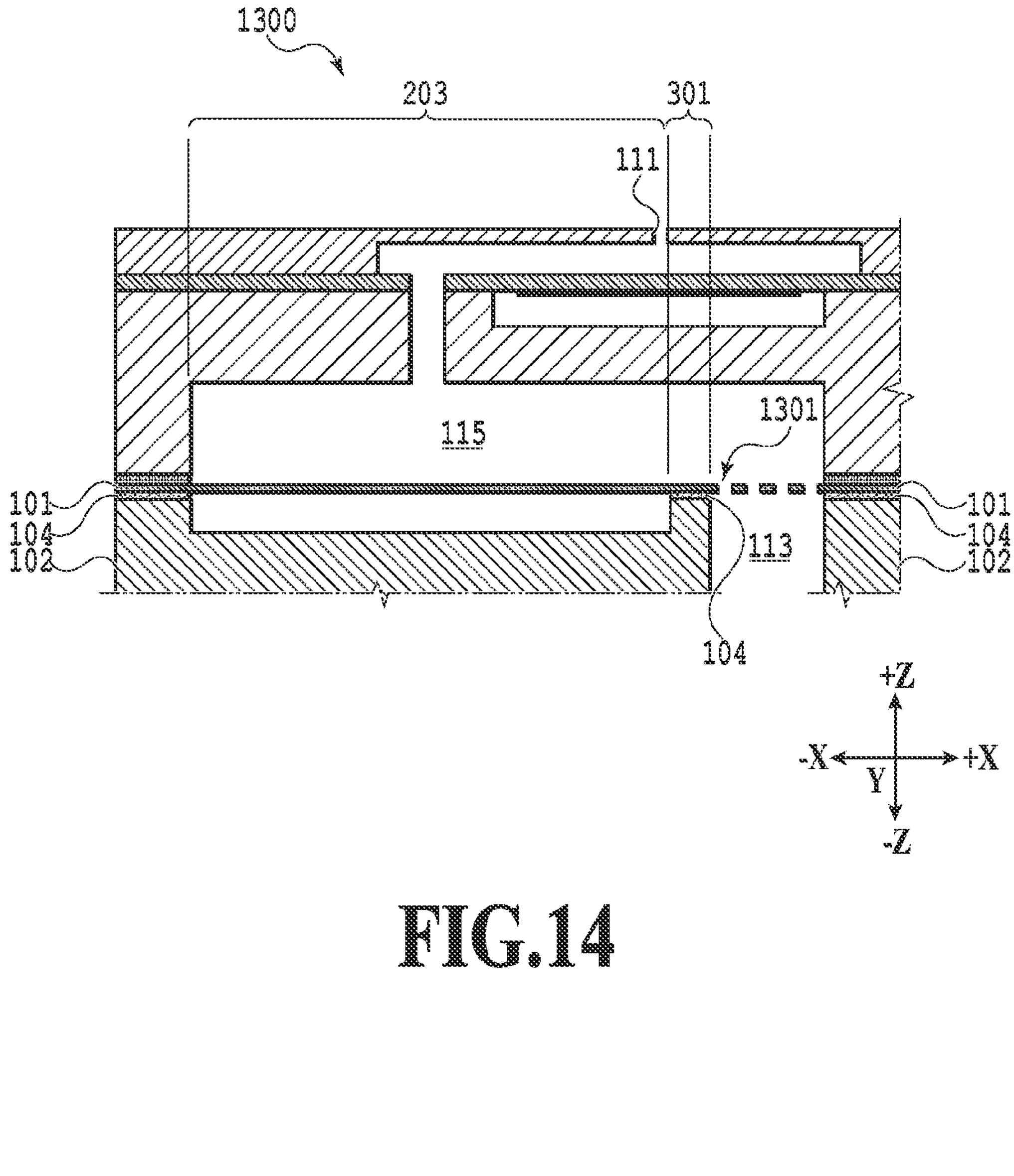
FIG. 14 is a schematic cross-sectional front diagram of a liquid ejection substrate in one embodiment.

FIG. 14 is a schematic cross-sectional front diagram of the fourth liquid ejection substrate 1300 in the present embodiment. Here, the function of the filter portion 1301 is explained mainly and the bonding between the first support substrate 102 and the elastic member 101 will be described later by using FIG. 15.

As shown in FIG. 13 and FIG. 14, in the elastic member 101 of the present embodiment, a filter portion 1301 is formed. The filter portion 1301 is formed at the position at which the liquid flowing from the first flow path 113 is caused to communicate with the second flow path 115 in the state where the first support substrate 102 and the first substrate member 106 are bonded to each other with the elastic member 101 being sandwiched in between. According to the configuration such as this, it is possible to suppress foreign matter larger than the opening of the filter portion 1301 from flowing into the second flow path 115 from the first flow path 113. That is, according to the fourth liquid ejection substrate 1300 in the present embodiment, it is possible to cause the elastic member 101 to have the filter function and the damper function. The shape of the opening in the filter portion 1301 is not limited to a circle. It is not necessary for the shape of the opening in the filter portion 1301 to be circular as long as the shape is capable of suppressing foreign matter from flowing into the second flow path 115 from the first flow path 113. For example, the shape of the opening in the filter portion 1301 may be the shape of a slit.

Modification Example 1 of Fourth Embodiment

Figure 15:
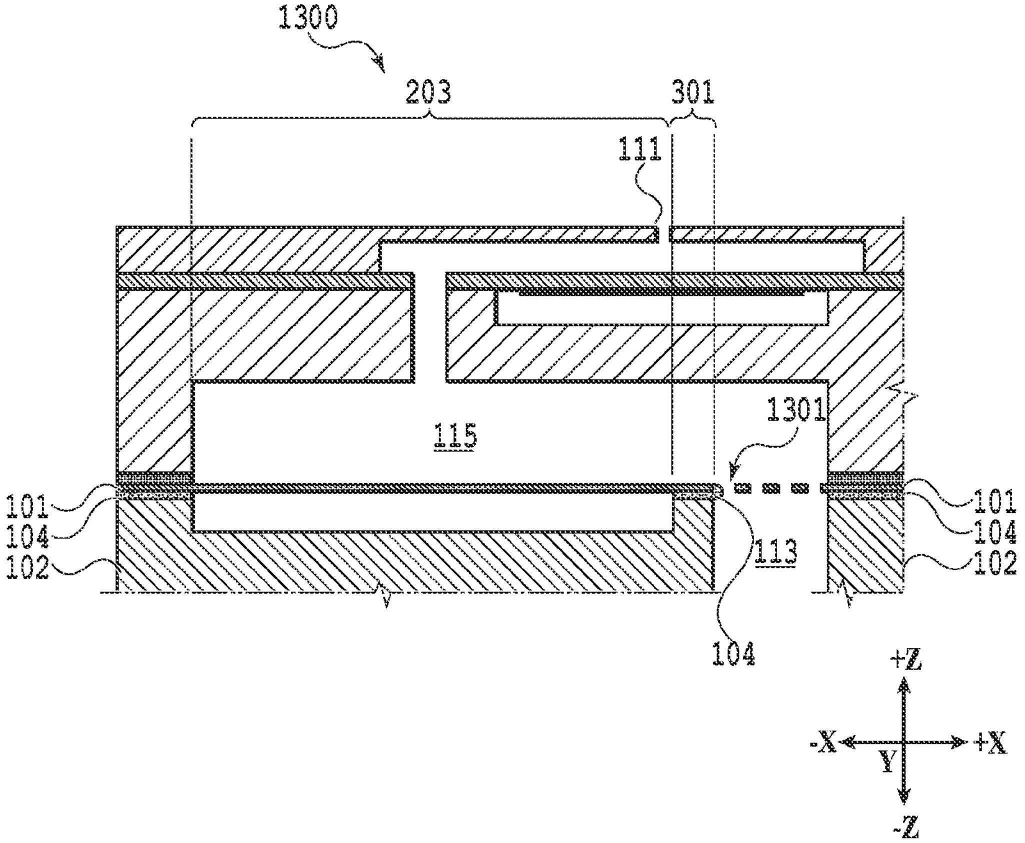
FIG. 15 is a schematic cross-sectional front diagram of a liquid ejection substrate in one embodiment.

FIG. 15 is a schematic cross-sectional front diagram of the fourth liquid ejection substrate 1300 in the present modification example.

As shown in FIG. 15, the first bonding member 104 in the present modification example fixes the bottom surface of the elastic member 101 and the inner circumferential surface of the opening in the filter portion 1301. According to the configuration such as this, the elastic member 101 is fixed from two directions (+Z-direction and −X-direction). By part of the opening in the filter portion 1301 being covered by the first bonding member 104, the amount of the liquid flowing into the second flow path 115 from the first flow path 113 is reduced compared to the case where the whole of the opening in the filter portion 1301 is not covered by the first bonding member 104.

Due to this, within the second flow path 115, the impact at the time of liquid hitting the second area 203 is relaxed. Consequently, according to the fourth liquid ejection substrate 1300 in the present embodiment, it is possible to cause the elastic member 101 to have the filter function and the damper function.

Modification Example 2 of Fourth Embodiment

Figure 16:
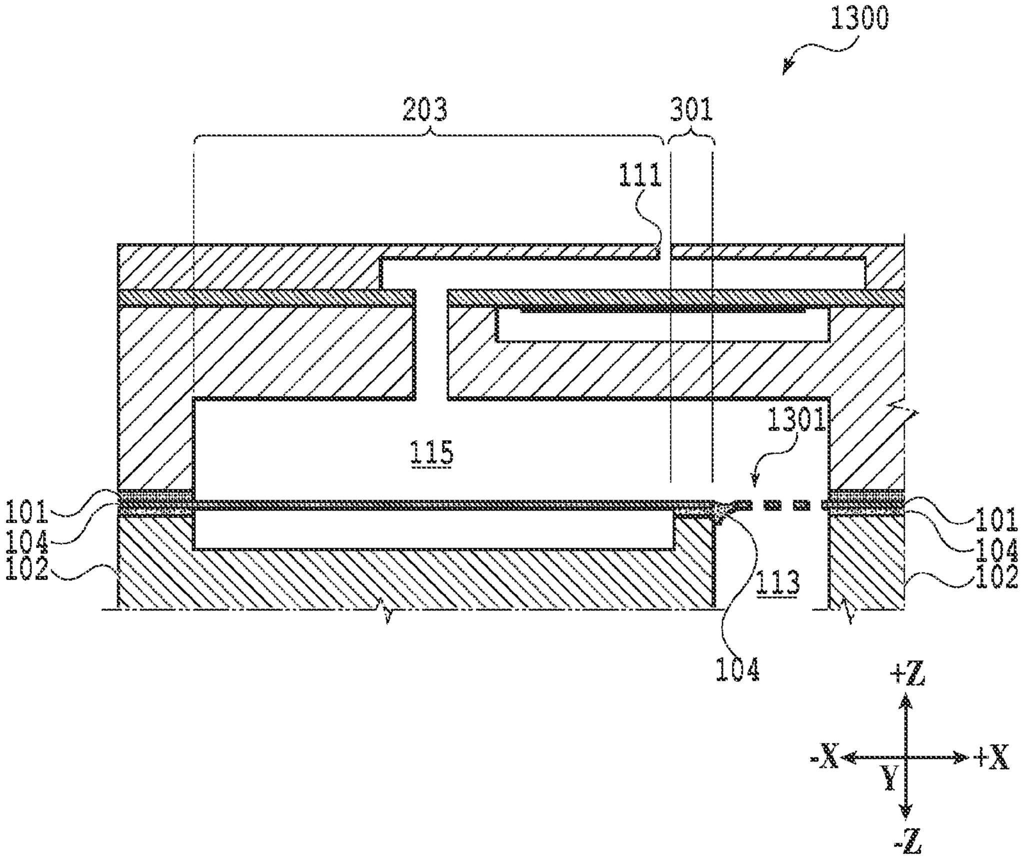
FIG. 16 is a diagram showing a modification example of a liquid ejection substrate.

FIG. 16 is a diagram showing the fourth liquid ejection substrate 1300 in the present modification example.

As shown in FIG. 16, by the first bonding member 104 sticking to the opening of the filter portion 1301, there is a case where the meniscus of the first bonding member 104 is formed. In the case, the meniscus of the first bonding member 104 is formed in the minute gap, and therefore, the first bonding member 104 enters the state of building a bridge over the opening of the filter portion 1301.

According to the configuration such as this, it is possible to further reduce the amount of the liquid flowing into the second flow path 115 from the first flow path 113. Consequently, according to the fourth liquid ejection substrate 1300 in the present modification example, the elastic member 101 is suppressed from peeling off from the first support substrate 102 in the third area compared to the example in FIG. 15.

Modification Example 3 of Fourth Embodiment

Figure 17:
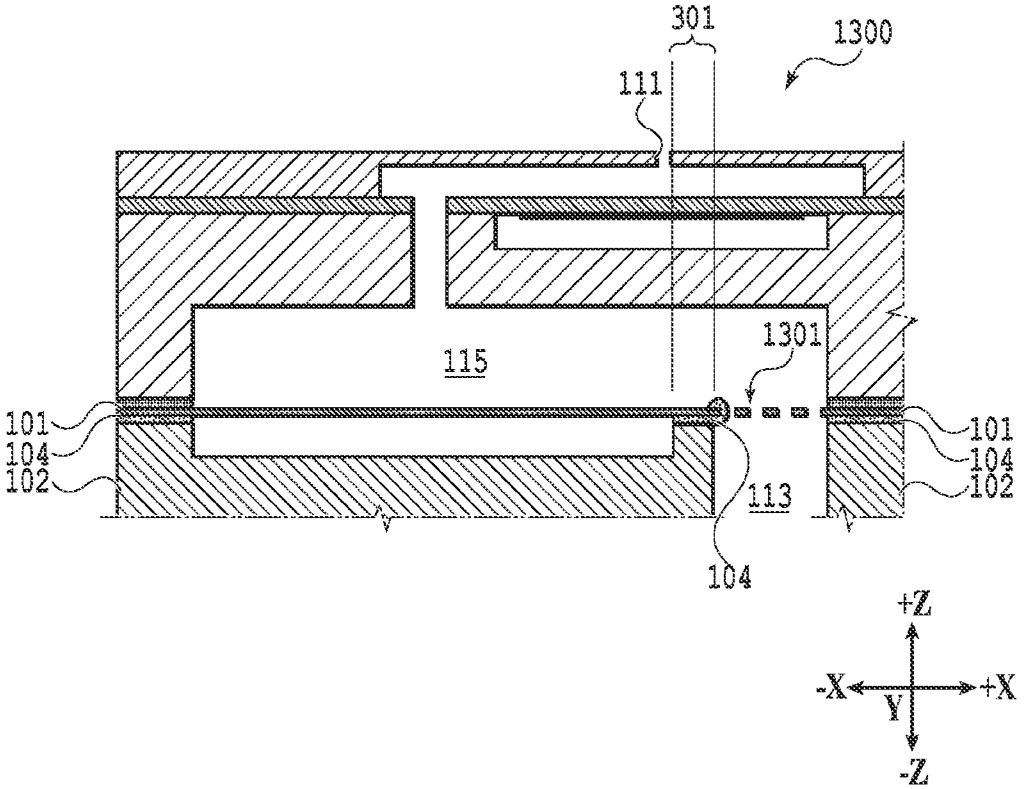
FIG. 17 is a diagram showing a modification example of a liquid ejection substrate.

FIG. 17 is a diagram showing the fourth liquid ejection substrate 1300 in the present modification example.

As shown in FIG. 17, the first bonding member 104 in the present modification example sticks continuously to the bottom surface of the elastic member 101, the inner circumferential surface of the opening in the filter portion 1301, and the top surface of the elastic member 101. According to the configuration such as this, in the third area 301, the elastic member 101 is fixed from three directions. Consequently, according to the fourth liquid ejection substrate 1300 in the present modification example, it is possible to suppress the elastic member 101 from peeling off from the first support substrate 102 more than in the example in FIG. 15.

Modification Example 4 of Fourth Embodiment

Figure 18:
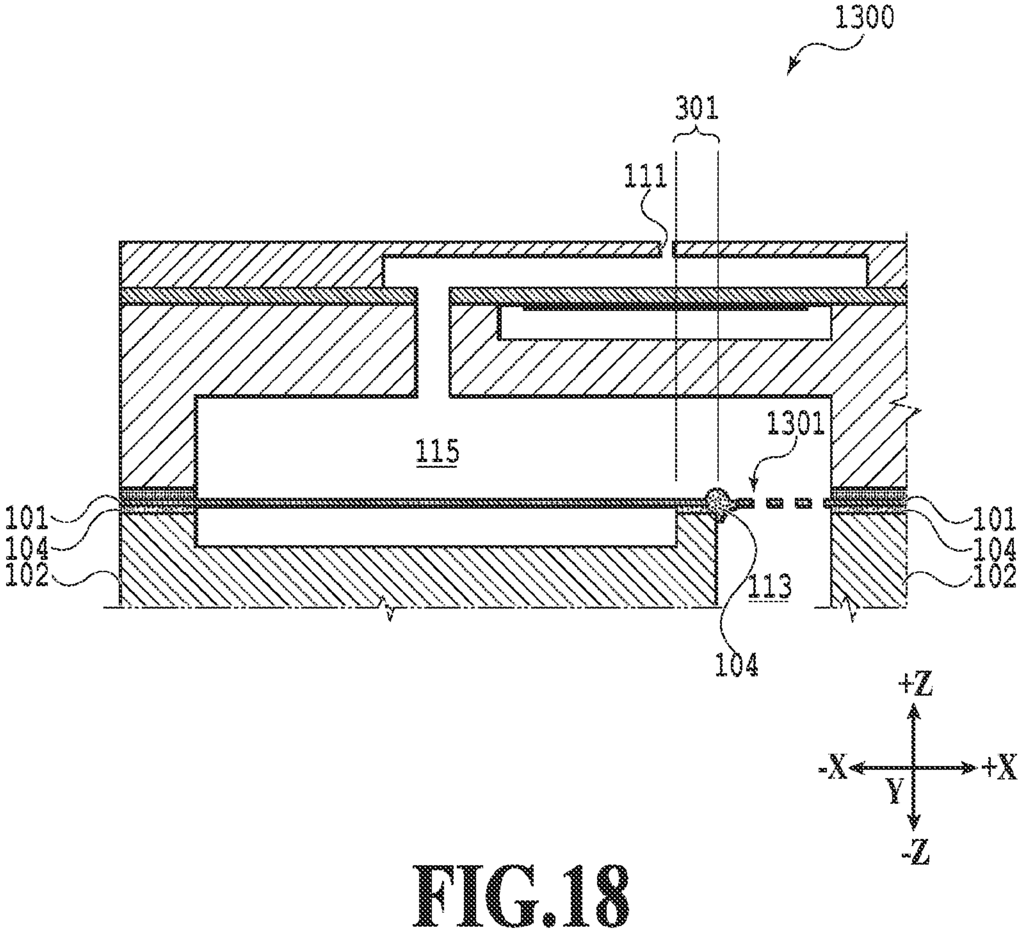
FIG. 18 is a diagram showing a modification example of a liquid ejection substrate.

FIG. 18 is a diagram showing the fourth liquid ejection substrate 1300 in the present modification example.

As shown in FIG. 18, the first bonding member 104 in the present modification example continuously fixes the bottom surface of the elastic member 101, the inner circumferential surface of the opening in the filter portion 1301, and the top surface of the elastic member 101. Further, the meniscus of the first bonding member 104 is formed so as to completely cover at least one of a plurality of openings formed in the filter portion 1301. In the present example, the first bonding member 104 also sticks to part of the inner circumferential surface of the first flow path 113.

According to the configuration such as this, the bonding area between the first support substrate 102 and the elastic member 101 increases further in the vicinity of the third area 301. Consequently, according to the liquid ejection substrate of the present modification example, it is possible to suppress the elastic member 101 from peeling off more than in the example in FIG. 17.

Fifth Embodiment

In the following, with reference to the drawings, a fifth embodiment in the technique of the present invention is explained. In the following explanation, for the configuration the same as or corresponding to that of the above embodiments, the same symbols and names are used and explanation thereof is omitted appropriately and different points are explained mainly. An object of the present embodiment is to use a bonding member excellent in bondability and a bonding member having liquid corrosion resistance separately in accordance with situations.

Figure 19A:
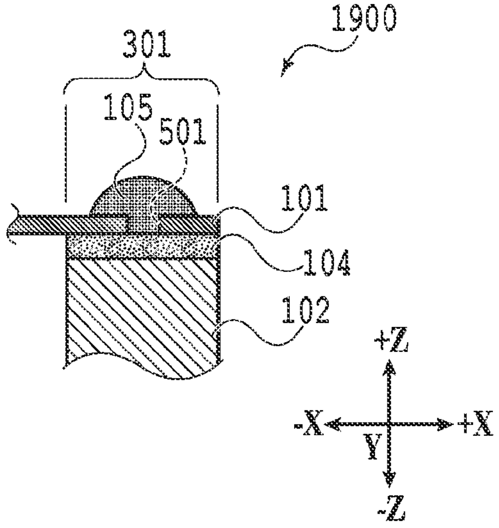
FIG. 19A to FIG. 19C are each a schematic cross-sectional front diagram of a liquid ejection substrate in one embodiment.
Figure 19B:
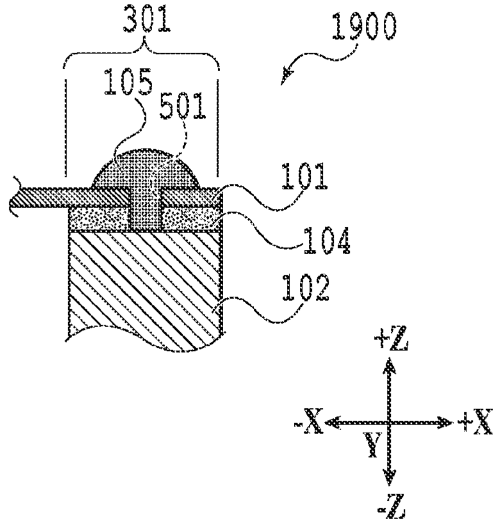
Figure 19C:
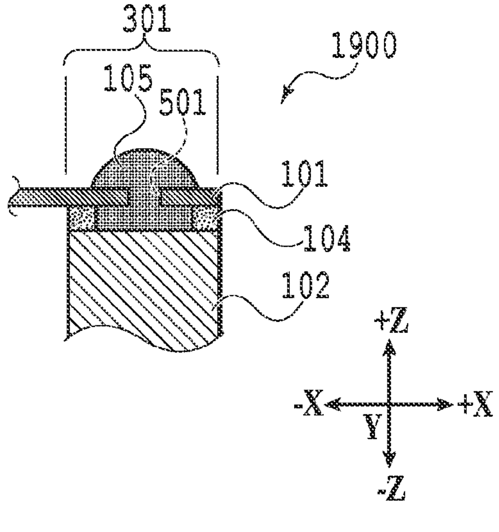

FIG. 19A to FIG. 19C are each a schematic front cross-sectional diagram of a fifth liquid ejection substrate 1900 in the present embodiment. FIG. 19A is an enlarged diagram of the third area 301 of the fifth liquid ejection substrate 1900 in the present embodiment.

As shown in FIG. 19A, in the third area 301 in the present embodiment, the second bonding member 105 sticks continuously to the elastic member 101 from the top surface of the elastic member 101 to the inner circumferential surface of the second opening 501. The first bonding member 104 is applied to the top surface of the first support substrate 102. However, the first bonding member 104 is applied to the position that does not stick to the inner circumferential surface of the second opening 501.

According to the configuration such as this, the second bonding member 105 communicates from the top surface of the elastic member 101 until reaching the first bonding member 104 located under (−Z-direction) the bottom surface of the elastic member 101. Because of this, in the third area 301, the elastic member 101 is fixed so as to be sandwiched between the first bonding member 104 and the second bonding member 105.

Further, the first bonding member 104 has properties comparatively excellent in bondability, and therefore, the bonding with the first support substrate 102 becomes good. Then, the second bonding member 105 has liquid corrosion resistance, and therefore, it is possible to suppress the corrosion by a liquid of the bonding portion between the elastic member 101 and the first support substrate 102.

According to the fifth liquid ejection substrate 1900 such as this of the present embodiment, for example, it is possible to use the two types of bonding members separately in accordance with situations, such as by using a material excellent in bondability with the first support substrate 102 as the first bonding member 104 and selecting a material excellent in liquid corrosion resistance as the second bonding member 105.

Modification Example 1 of Fifth Embodiment

FIG. 19B is a diagram showing the fifth liquid ejection substrate 1900 in the present modification example.

As shown in FIG. 19B, in the third area 301 in the present modification example, the second bonding member 105 sticks continuously to the elastic member 101 from the top surface of the elastic member 101 until reaching the top surface of the first support substrate 102 though the second opening 501. In the present modification example, at the portion through which the second bonding member 105 passes, the layer of the first bonding member 104 is not formed.

With the configuration such as this, it is also possible to use the bonding member excellent in bondability and the bonding member having liquid corrosion resistance separately in accordance with situations.

Modification Example 2 of Fifth Embodiment

FIG. 19C is a diagram showing the fifth liquid ejection substrate 1900 in the present modification example.

As shown in FIG. 19C, in the third area 301 in the present modification example, the second bonding member 105 sticks continuously to the top surface of the elastic member 101, the inner circumferential surface of the second opening 501, and the first support substrate 102. In the present modification example, at the portion through which the second bonding member 105 passes, the layer of the first bonding member 104 is not formed.

According to the configuration such as this, it is possible for the second bonding member 105 to fix the elastic member 101 like an anchor. Consequently, according to the fifth liquid ejection substrate 1900 in the present modification example, it is possible to suppress the elastic member 101 from peeling off more than in the example in FIG. 19A and FIG. 19B.

Sixth Embodiment

In the following, with reference to the drawings, a sixth embodiment in the technique of the present invention is explained. In the following explanation, for the configuration the same as or corresponding to that of the above embodiments, the same symbols and names are used and explanation thereof is omitted appropriately and different points are explained mainly. An object of the present embodiment is to further suppress the elastic member 101 from peeling off.

Figure 20A:
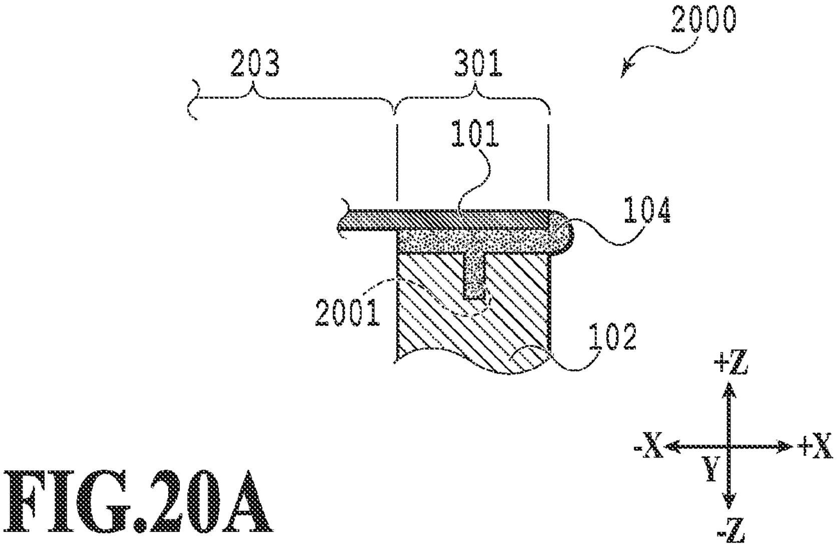
FIG. 20A and FIG. 20B are each a schematic cross-sectional front diagram of a liquid ejection substrate in one embodiment.
Figure 20B:
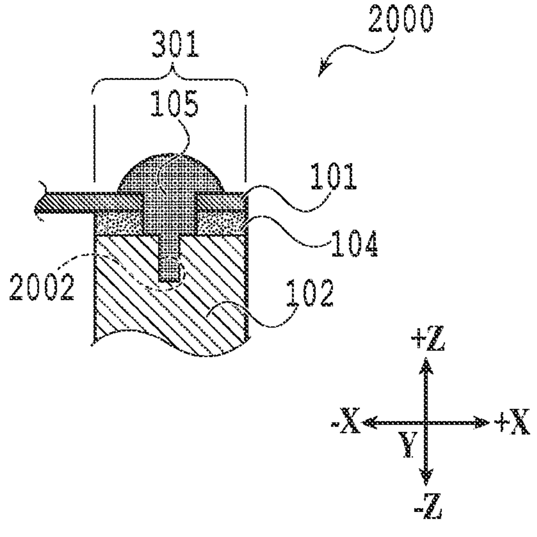

FIG. 20A and FIG. 20B are each a schematic front cross-sectional diagram of a sixth liquid ejection substrate 2000 in the present embodiment. FIG. 20A is a schematic enlarged diagram of the third area 301 in the present embodiment.

As shown in FIG. 20A, the first support substrate 102 in the present embodiment has a first groove 2001 to which the first bonding member 104 sticks. A plurality of the first grooves 2001 may be formed.

According to the configuration such as this, in a case where the first bonding member 104 is applied, it is possible to suppress the first bonding member 104 from bulging out to the second area 203. That is, the first bonding member 104 having bulged out is also suppressed from blocking the function as a damper, and therefore, the elastic member 101 is also suppressed from peeling off from the first support substrate 102. Consequently, according to the sixth liquid ejection substrate 2000 of the present embodiment, it is possible to suppress the elastic member 101 from peeling off more than in the example in FIG. 10.

Modification Example of Sixth Embodiment

FIG. 20B is a diagram showing the sixth liquid ejection substrate 2000 in the present modification example. As shown in FIG. 20B, in the elastic member 101 in the present modification example, the second opening 501 is formed. The first support substrate 102 in the present modification example has a second groove 2002 to which the second bonding member 105 sticks. A plurality of the second grooves 2002 may be formed.

According to the configuration such as this, in the third area 301 in the present modification example, in a case where the second bonding member 105 is applied to the top surface of the elastic member 101, the second bonding member 105 communicates with the inside of the second groove 2002 from the top surface of the elastic member 101. Consequently, it is possible for the second bonding member 105 to fix the elastic member 101 like an anchor. Consequently, according to the sixth liquid ejection substrate 2000 of the present modification example, it is possible to suppress the elastic member 101 from peeling off.

Other Embodiments

The first to sixth embodiments may be combined appropriately and embodied.

In the above embodiments, each of the first support substrate 102, the first substrate member 106, and the second substrate member 110 is a separate member, but each does not need to be a separate member. For example, the first support substrate 102, the first substrate member 106, and the second substrate member 110 may be included in one substrate.

In the above embodiments, as one example of the method of forming the first opening 114 and the second opening 501 in the elastic member 101, dry etching is described. As another example, there is an example in which the first opening 114 and the second opening 501 are formed by performing patterning with exposure in a case where the elastic member 101 includes a photosensitive resin.

In the fifth process in FIG. 6E, to the bottom surface of the second bonding member 105, the second support substrate 103 to which the second bonding member 105 is applied, and the elastic member 101 are bonded. As another example of the fifth process, there is an example in which to the top surface of the elastic member 101 to which the second bonding member 105 is applied, the bottom surface of the first substrate member 106 to which the second bonding member 105 is not applied is bonded.

In the above embodiments, as one example of the driving unit configured to apply pressure to the ink within the pressure chamber, the piezoelectric method using a piezoelectric element is described. As another example of the driving unit configured to apply pressure to the ink within the pressure chamber, there are a method that utilizes an electrostatic force, a method that utilizes a heating element, and the like.

According to the technique of the present invention, it is possible to fix an elastic member firmly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-181952, filed Nov. 14, 2022, which are hereby incorporated by reference herein in its entirety.

What is claimed is:

1. A liquid ejection head comprising:
a first substrate;
a second substrate; and
a damper member suppressing vibrations of a liquid, wherein
the damper member is bonded to the first substrate and the second substrate by an adhesive agent,
the damper member has a first area sandwiched between the first substrate and the second substrate and a second area not sandwiched between the first substrate and the second substrate,
in the second area, the adhesive agent adheres to a side surface of the damper member,
in the first substrate, a first flow path is formed, the first flow path being a liquid supply flow path,
in the second substrate, a second flow path capable of storing a liquid supplied from the first flow path, a plurality of pressure chambers communicating with the second flow path, and a plurality of ejection ports arranged in each of the pressure chambers and capable of ejecting a liquid stored in the pressure chambers are formed, and
in the first area, the damper member is bonded to the first substrate via a first adhesive agent and bonded to the second substrate via a second adhesive agent different from the first adhesive agent.

2. The liquid ejection head according to claim 1, wherein the side surface is an inner circumferential surface of an opening formed for the damper member and is exposed to the first flow path.

3. The liquid ejection head according to claim 1, wherein the side surface is an inner circumferential surface of a through-hole formed in a bonding surface with the first substrate in the damper member.

4. The liquid ejection head according to claim 1, wherein the side surface is an inner circumferential surface of an opening communicating with the first flow path and having an inner diameter greater than or equal to an inner diameter of the first flow path.

5. The liquid ejection head according to claim 4, wherein
the inner diameter of the opening is greater than the inner diameter of the first flow path, and
the adhesive agent adheres to the inner circumferential surface of the opening in a state in which the adhesive agent does not bulge out to the inside of the first flow path.

6. The liquid ejection head according to claim 5, wherein the adhesive agent adheres continuously to a bottom surface of the damper member, the inner circumferential surface of the opening, and a top surface of the damper member.

7. A liquid ejection head comprising:
a first substrate;
a second substrate; and
a damper member suppressing vibrations of a liquid, wherein
the damper member is bonded to the first substrate and the second substrate by an adhesive agent,
the damper member has a first area sandwiched between the first substrate and the second substrate and a second area not sandwiched between the first substrate and the second substrate,
in the second area, the adhesive agent adheres to a side surface of the damper member,
the side surface is an inner circumferential surface of a through-hole formed in a bonding surface with the first substrate in the damper member, and
the adhesive agent flows into the inside of the through-hole.

8. The liquid ejection head according to claim 7, wherein the through-hole is arranged in plural along the bonding surface with the first substrate.

9. The liquid ejection head according to claim 7, wherein the through-hole is an opening extending along the bonding surface with the first substrate.

10. The liquid ejection head according to claim 1, wherein
the damper member extends from an area corresponding to the second flow path to an area corresponding to the first flow path, and
the side surface is an inner circumferential surface of an opening of a filter formed in the area corresponding to the first flow path.

11. The liquid ejection head according to claim 10, wherein
the adhesive agent covers part of the opening of the filter.

12. The liquid ejection head according to claim 1, wherein in the vicinity of the second area, the adhesive agent flows into a groove formed in the first substrate.

13. The liquid ejection head according to claim 10, wherein the adhesive agent flows into a groove formed in the first substrate.

14. The liquid ejection head according to claim 1, wherein the first adhesive agent is bonded to the first substrate and the second adhesive agent is bonded to the first adhesive agent and adheres continuously to the damper member from a bottom surface of the damper member to a cross-section of the damper member.

15. The liquid ejection head according to claim 13, wherein the first substrate has a second groove to which the second adhesive agent adheres.

16. The liquid ejection head according to claim 1, wherein each of the plurality of pressure chambers has a driving unit configured to vary pressure within the pressure chamber.

17. The liquid ejection head according to claim 1, further comprising:

a casing capable of storing a liquid to be supplied to the first flow path; and an electrical connection portion sending power and a control signal to the second substrate.

18. A manufacturing method of a liquid ejection head, the manufacturing method comprising:

forming a through-hole and a concave portion in a first substrate;

applying an adhesive agent to the concave portion and an area in which the through-hole is not formed in a surface in which the concave portion of the first substrate is formed;

placing a sheet-shaped damper member on the adhesive agent;

forming an opening in the damper member;

causing the adhesive agent to flow on an inner circumferential surface of the opening;

hardening the adhesive agent; and bonding a second substrate to an inner circumferential portion on a surface on the opposite side of a surface to which the first substrate is bonded in the damper member.

* * * * *